US012490022B2

(12) United States Patent
Liew et al.

(10) Patent No.: US 12,490,022 B2
(45) Date of Patent: Dec. 2, 2025

(54) TELESCOPIC SOUNDBAR

(71) Applicant: Top Victory Investments Limited, Hong Kong (HK)

(72) Inventors: Hean Chow Liew, Kowloon (HK); Gozali Goh, Kowloon (HK); Walter Law, Kowloon (HK)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 141 days.

(21) Appl. No.: 18/614,369

(22) Filed: Mar. 22, 2024

(65) Prior Publication Data

US 2025/0220338 A1 Jul. 3, 2025

(30) Foreign Application Priority Data

Jan. 2, 2024 (TW) ................................ 113100064

(51) Int. Cl.
*H04R 1/40* (2006.01)

(52) U.S. Cl.
CPC ....... *H04R 1/403* (2013.01); *H04R 2201/403* (2013.01)

(58) Field of Classification Search
CPC .......................... H04R 1/403; H04R 2201/403
USPC .......................................................... 381/150
See application file for complete search history.

(56) References Cited

U.S. PATENT DOCUMENTS

| | | | | |
|---|---|---|---|---|
| 11,772,572 B2 * | 10/2023 | White | H04R 1/026 381/86 |
| 2008/0279406 A1 * | 11/2008 | D'Hoogh | H04R 1/2811 381/387 |
| 2015/0195635 A1 * | 7/2015 | Garfio | H04R 31/006 381/386 |

FOREIGN PATENT DOCUMENTS

JP 7026155 B2 * 2/2022 ............... H04R 1/02

* cited by examiner

*Primary Examiner* — Sean H Nguyen
(74) *Attorney, Agent, or Firm* — HSML P.C.

(57) ABSTRACT

A telescopic soundbar has a length direction, and includes a guiding device and first and second speaker devices disposed on the guiding device and arranged along the length direction. At least one of the first and second speaker devices is a sliding speaker device slidably connected to the guiding device and operable to telescopically slide relative to the guiding device in the length direction.

32 Claims, 41 Drawing Sheets

TELESCOPIC SOUNDBAR

CROSS-REFERENCE TO RELATED APPLICATION

This application claims priority to Taiwanese Invention Patent Application No. 113100064, filed on Jan. 2, 2024, and incorporated by reference herein in its entirety.

FIELD

The present disclosure relates to a speaker, more particularly to a telescopic soundbar that is telescopic to adjust a length thereof.

BACKGROUND

An existing soundbar is typically placed in front of a television for enhancing the sound performance thereof. A length of the soundbar generally must match a length of the television. The length of the soundbar plays an important role in the sound performance, that is, the longer the soundbar, the farther the distance between a left speaker and a right speaker to create a wider sound field, thereby providing a user with a better sound experience. However, since the length of the existing soundbar is fixed, the user cannot adjust and change the length of the soundbar to match the length of the television or enhance the sound performance thereof according to his/her requirements, so that use of the existing soundbar is limited.

Furthermore, in order to enable a packaging box to load a greater number of the soundbars so as to enhance and optimize loading capacity, it is usually necessary to minimize the length of the soundbar. Since the length of the existing soundbar is fixed, optimizing the loading capacity of the packaging box and enhancing the sound performance cannot be simultaneously satisfied using the existing soundbar.

SUMMARY

Therefore, an object of the present disclosure is to provide a telescopic soundbar that can alleviate at least one of the drawbacks of the prior art.

According to this disclosure, the telescopic soundbar has a length direction, a width direction, and a height direction that are perpendicular to each other, and includes a guiding device and first and second speaker devices disposed on the guiding device and arranged along the length direction. At least one of the first and second speaker devices is a sliding speaker device slidably connected to the guiding device and operable to telescopically slide relative to the guiding device in the length direction.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
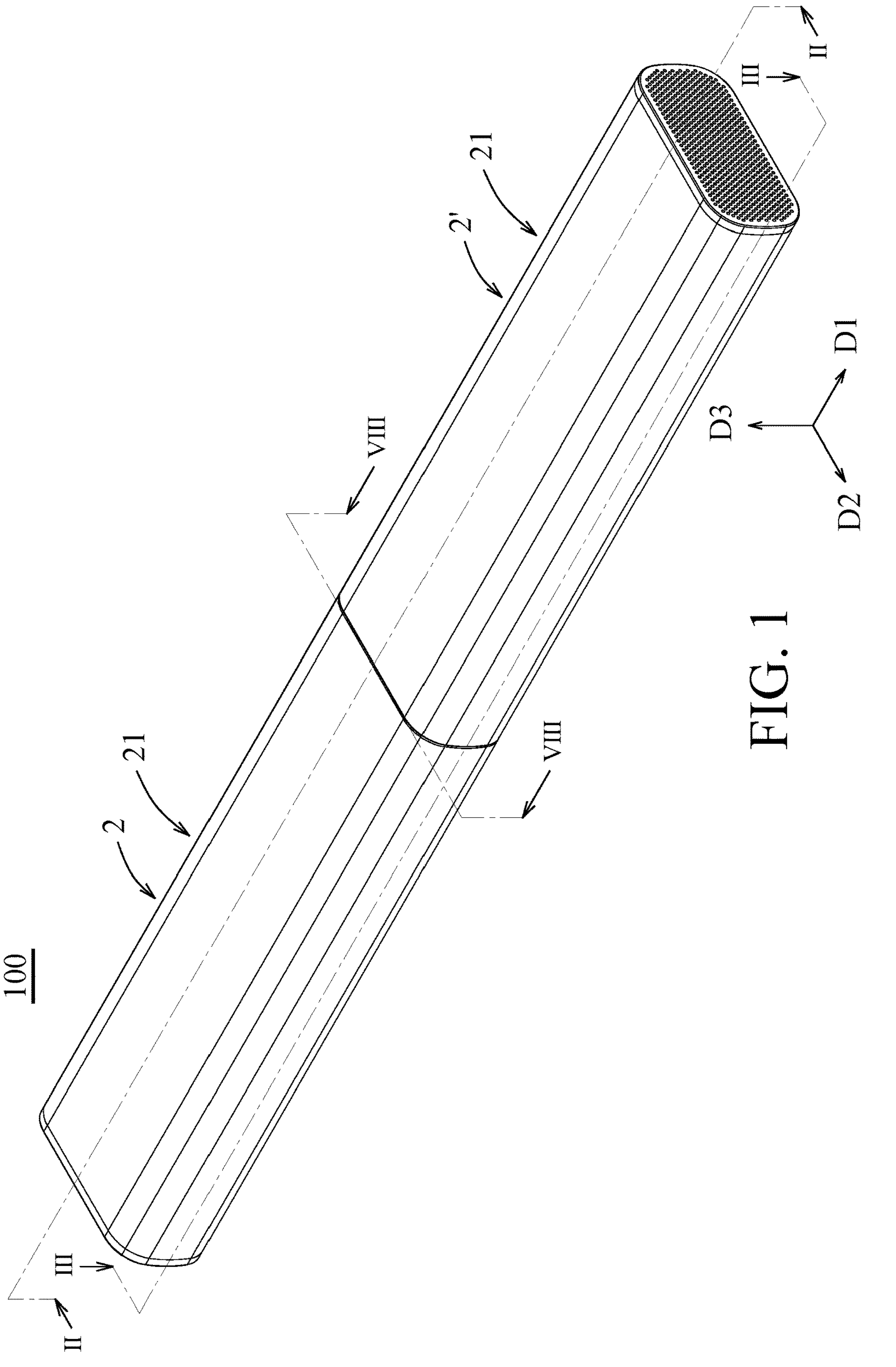
FIG. 1 is a perspective view of a telescopic soundbar according to the first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 6, a telescopic soundbar 100 according to the first embodiment of the present disclosure includes a guiding device 1, a first speaker device 2, a second speaker device 2', and two transmission lines 3. The telescopic soundbar 100 has a length direction (D1), a width direction (D2), and a height direction (D3) that are perpendicular to each other. As shown in FIG. 1, the length direction (D1) is, for example, a left-right direction, and the arrow is pointing to the left; the width direction (D2) is, for example, a front-rear direction, and the arrow is pointing to the front; and the height direction (D3) is, for example, an up-down direction, and the arrow is pointing up.

The guiding device 1 includes an elongated housing 11, an electronic control module 12, a guide rail 13, and two resilient locking members 15. The elongated housing 11 has a length extending in the length direction (D1), and includes a base wall 111, and two side walls 112 respectively located on two opposite sides of the base wall 111 and spaced apart from each other along the length direction (D1). In this embodiment, the base wall 111 is exemplified as a lower wall, but is not limited thereto. In other embodiments, the base wall 111 may be an upper wall. The elongated housing 11 defines a receiving space 113. The receiving space 113 has an accommodating chamber 114 between the side walls 112, two side sockets 115 respectively formed in the side walls 112 and communicating with the accommodating chamber 114, and two side openings 116 respectively formed in the side walls 112 and communicating with the accommodating chamber 114. The side openings 116 are respectively located forwardly of the side sockets 115, and are adjacent to a front end of the elongated housing 11. The elongated housing 11 has two half housing portions 110 arranged along the length direction (D1). That is, each half housing portion 110 is a half structure of the elongated housing 11 in the length direction (D1).

Figure 2:
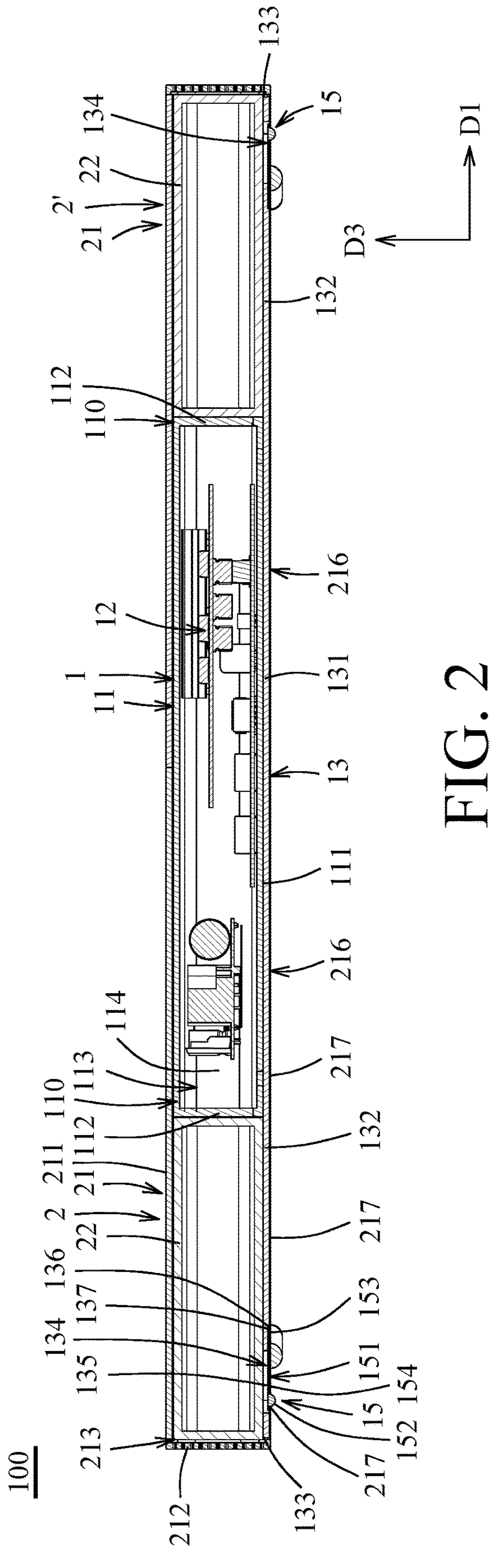
FIG. 2 is a sectional view taken along line II-II of FIG. 1, illustrating each of first and second speaker devices in a retracted position.
Figure 3:
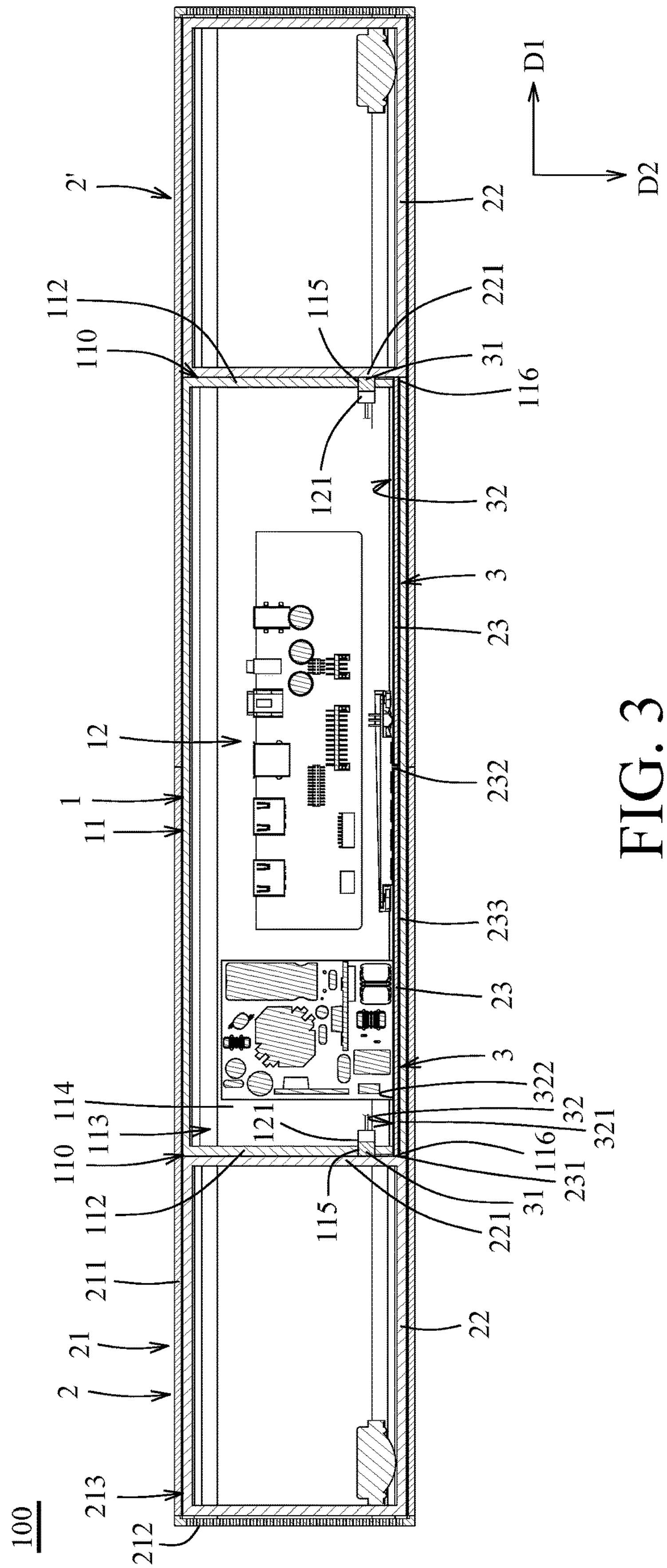
FIG. 3 is a sectional view taken along line III-III of FIG. 1, illustrating an assembly relationship among a guiding device, the first and second speaker devices, and two transmission lines.
Figure 4:
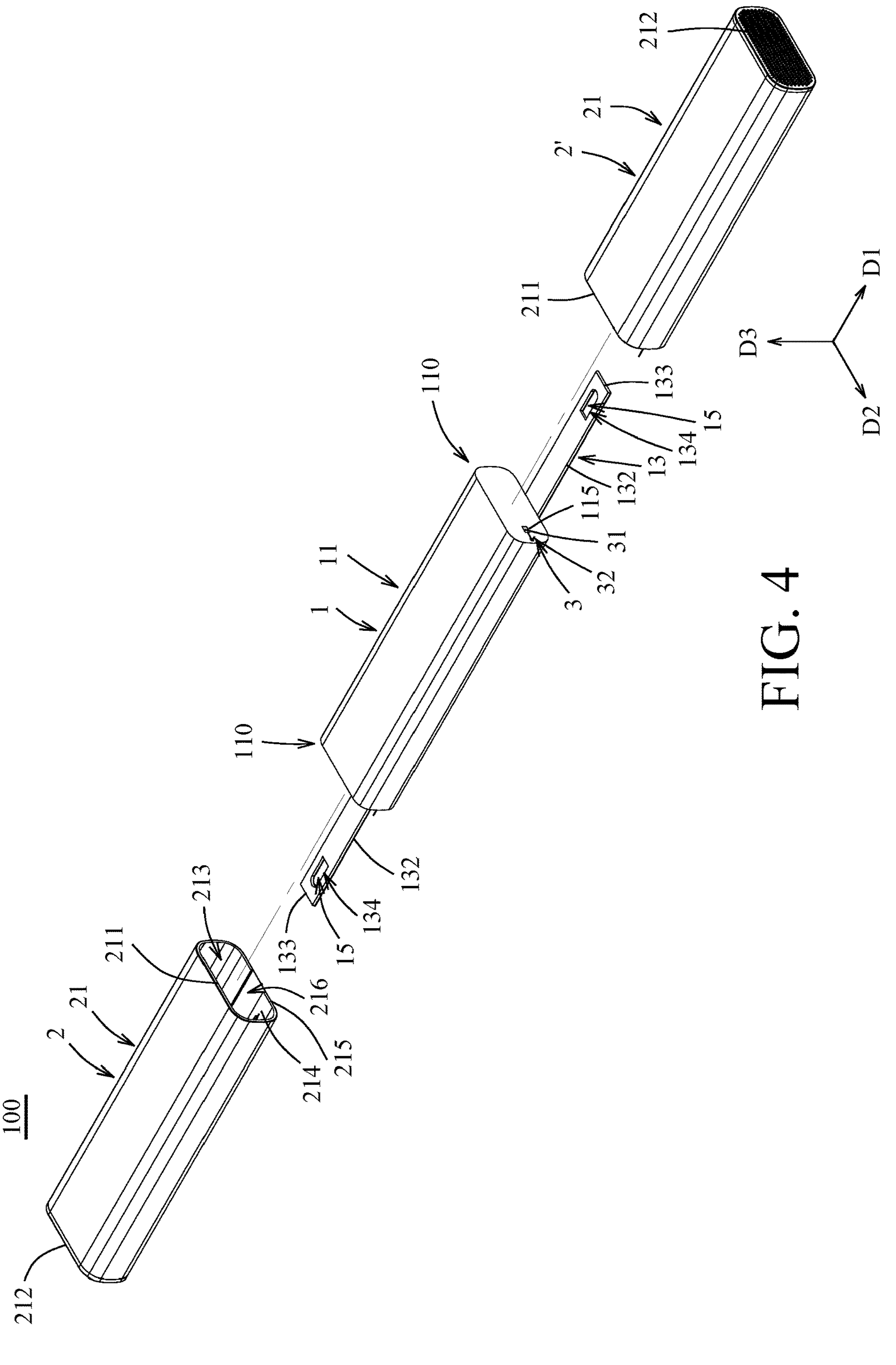
FIG. 4 is an exploded perspective view of the first embodiment.
Figure 8:
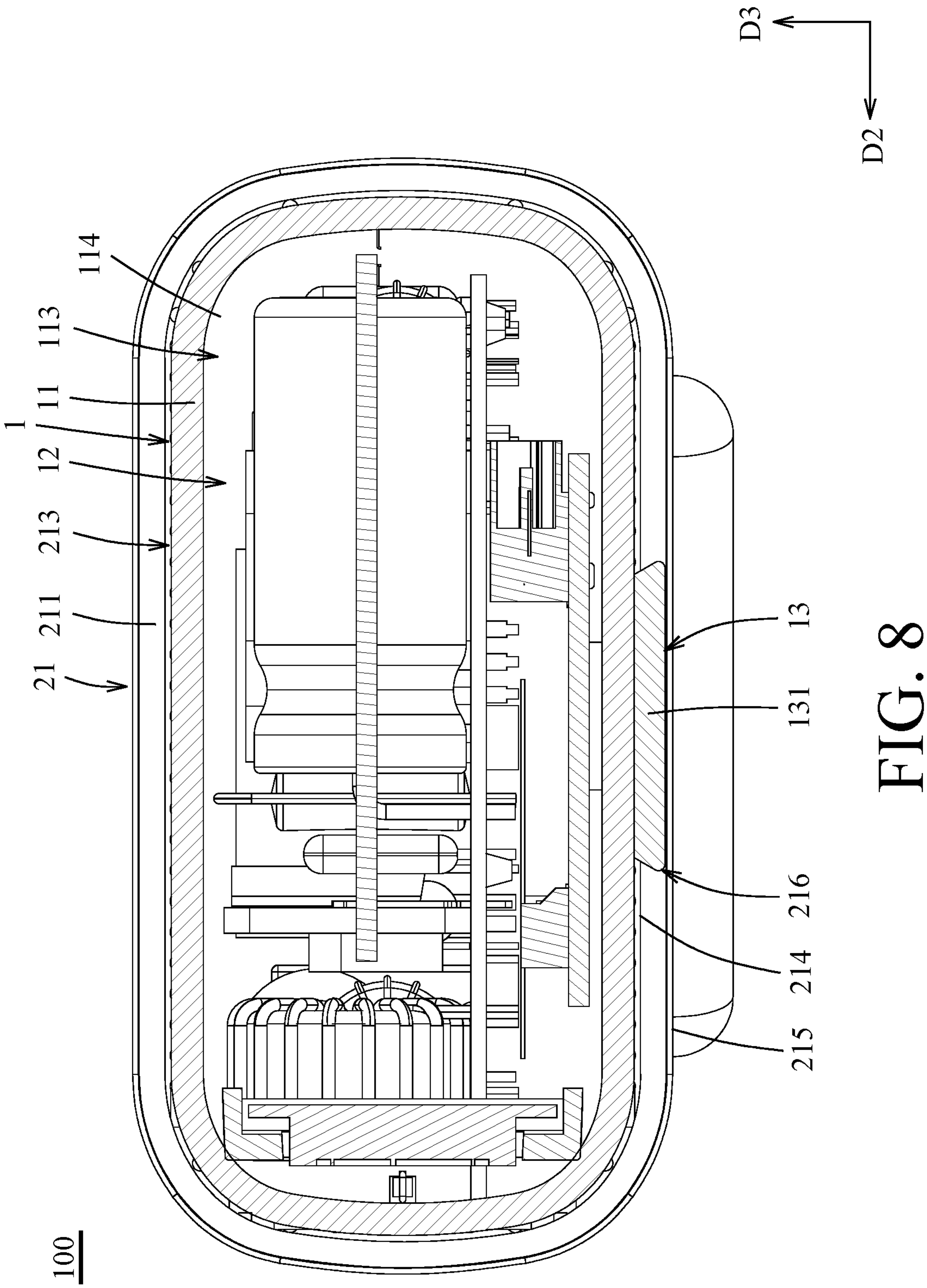
FIG. 8 is a sectional view taken along line VIII-VIII of FIG. 1.

Referring to FIG. 8, in combination with FIGS. 2 and 3, the electronic control module 12 is disposed in the accommodating chamber 114, and has the necessary components to achieve the functions required for the operation of the telescopic soundbar 100. The electronic control module 12 includes two connectors 121 respectively corresponding in position to the side sockets 115.

With reference to FIGS. 2 and 4 to 6, the guide rail 13 is made of, for example, a metal material, and is disposed on the lower or base wall 111 of the elongated housing 11. The guide rail 13 has a length longer than that of the elongated housing 11. That is, the guide rail 13 has a connecting section 131 fixedly connected to the lower wall 111 by, for example, welding or screw locking, and two protruding sections 132 respectively connected to two opposite ends of the connecting section 131 and respectively protruding out of the side walls 112. Each protruding section 132 has a distal end 133 spaced apart from the respective side wall 112 by a distance and formed with a receiving slot 134 adjacent to the distal end 133. The receiving slot 134 is elongated in the length direction (D1), and has a through hole portion 135 extending through the protruding section 132 and adjacent to the distal end 133, and a blind hole portion 136 communicating with one end of the through hole portion 135 that is opposite to the distal end 133. The blind hole portion 136 extends inwardly from a bottom surface of the protruding section 132.

Each resilient locking member 15 is made of, for example, a metal material, and has a resilient plate 151 and a locking protrusion 152. The resilient plate 151 of each locking member 15 is received in the receiving slot 134 of a respective one of the protruding sections 132, and has a connecting plate body 153 and a hanging plate body 154. The connecting plate body 153 is received in the blind hole portion 136 of the receiving slot 134, and is fixedly connected to a bottom surface 137 of the blind hole portion 136 by, for example, welding. The hanging plate body 154 is connected to an end of the connecting plate body 153, and is received in the through hole portion 135 of the receiving slot 134. The locking protrusion 152 protrudes integrally from a bottom surface of the hanging plate body 154, and extends out of the through hole portion 135 so as to be exposed from the bottom surface of the respective protruding section 132.

Referring back to FIGS. 2 to 4, the first and second speaker devices 2, 2' are oppositely disposed on the guiding device 1 along the length direction (D1). Specifically, the first and second speaker devices 2, 2' are respectively disposed on the half housing portions 110, and are respectively a right speaker device and a left speaker device. In this embodiment, each of the first and second speaker devices 2, 2' is a sliding speaker device slidably connected to the respective half housing portion 110, and operable to telescopically slide relative to the respective half housing portion 110 in the length direction (D1). Each of the first and second speaker devices 2, 2' is slidable relative to the respective half housing portion 110 between different positions. Through this, a user is allowed to adjust and change the distance between the first and second speaker devices 2, 2' according to his/her requirement so as to change the length of the telescopic soundbar 100 in the length direction (D1).

With reference to FIGS. 2 to 5, 7 and 8, each of the first and second speaker devices 2, 2' includes a sliding shell 21, a speaker module 22, and a push rod 23. The sliding shell 21 is slidably connected to the respective half housing portion 110 in the length direction (D1). In this embodiment, the sliding shell 21 is slidably sleeved on the respective half housing portion 110, and the elongated housing 11 can guide and limit the sliding shell 21 to slide only in the length direction (D1). The sliding shell 21 has a surrounding wall 211, and a side wall 212 disposed on an outer end of the surrounding wall 211 and cooperating with the same to define a sliding space 213. The sliding space 213 receives the respective half housing portion 110 when the sliding shell 21 is slidably connected to the same. The surrounding wall 211 has an inner wall surface 214, and an outer wall surface 215 opposite to the inner wall surface 214. A bottom wall portion of the surrounding wall 211 is formed with a slide groove 216 that is recessed from the inner wall surface 214 toward the outer wall surface 215, that extends along a length thereof, and that slidably receives the guide rail 13. In this embodiment, the guide rail 13 is a dovetail guide rail, and the slide groove 216 is a dovetail groove for slidably receiving the dovetail guide rail 13. Through the cooperation of the slide groove 216 and the guide rail 13, the effect of guiding and limiting the sliding shell 21 to slide only in the length direction (D1) can be achieved.

It should be noted that, in another implementation of the first embodiment, the guide rail 13 may be an inverted T-shaped guide rail, and the slide groove 216 may be an inverted T-shaped slide groove. Through this, the effect of guiding and limiting the sliding movement of the sliding shell 21 along the length direction (D1) can be similarly achieved.

Referring back to FIGS. 2, 5 and 7, the bottom wall portion of the surrounding wall 211 is further formed with a plurality of positioning holes 217 that extend from the outer wall surface 215 toward the inner wall surface 214, that are spaced apart from each other along the length thereof, and that communicate with the slide groove 216. The locking protrusion 152 of each resilient locking member 15 is configured to engage with a selected one of the positioning holes 217 in the sliding shell 21 of a respective one of the first and second speaker devices 2, 2' for locking the first or second speaker device 2, 2' in a selected one of the different positions. When the number of the positioning holes 217 is at least two, each of the first and second speaker devices 2, 2' is slidable relative to the guiding device 1 at least between a retracted position (see FIG. 2) and a fully extended position (see FIG. 13), and the locking protrusion 152 of each resilient locking member 15 is engaged with the selected one of the positioning holes 217 for locking the first or second speaker device 2, 2' in the retracted or fully extended position.

Specifically, in the first embodiment, the number of the positioning holes 217 in the sliding shell 21 of each of the first and second speaker devices 2, 2' is three, but is not limited thereto. Hence, each resilient locking member 15 can lock the first or second speaker device 2, 2' in the retracted position (see FIG. 2), the fully extended position (see FIG. 13), and a half extended position (see FIG. 12) between the retracted and fully extended positions. It should be noted that the number of the positioning holes 217 is determined based on the number of positions that the first and second speaker devices 2, 2' need to be positioned. For example, when the number of positions required for positioning the first and second speaker devices 2, 2' is two, that is, the retracted position and the fully extended position, then the number of the positioning holes 217 is also two; and when the number of positions required for positioning the first and second speaker devices 2, 2' is more than three, then the number of the positioning holes 217 is also more than three.

Figure 5:
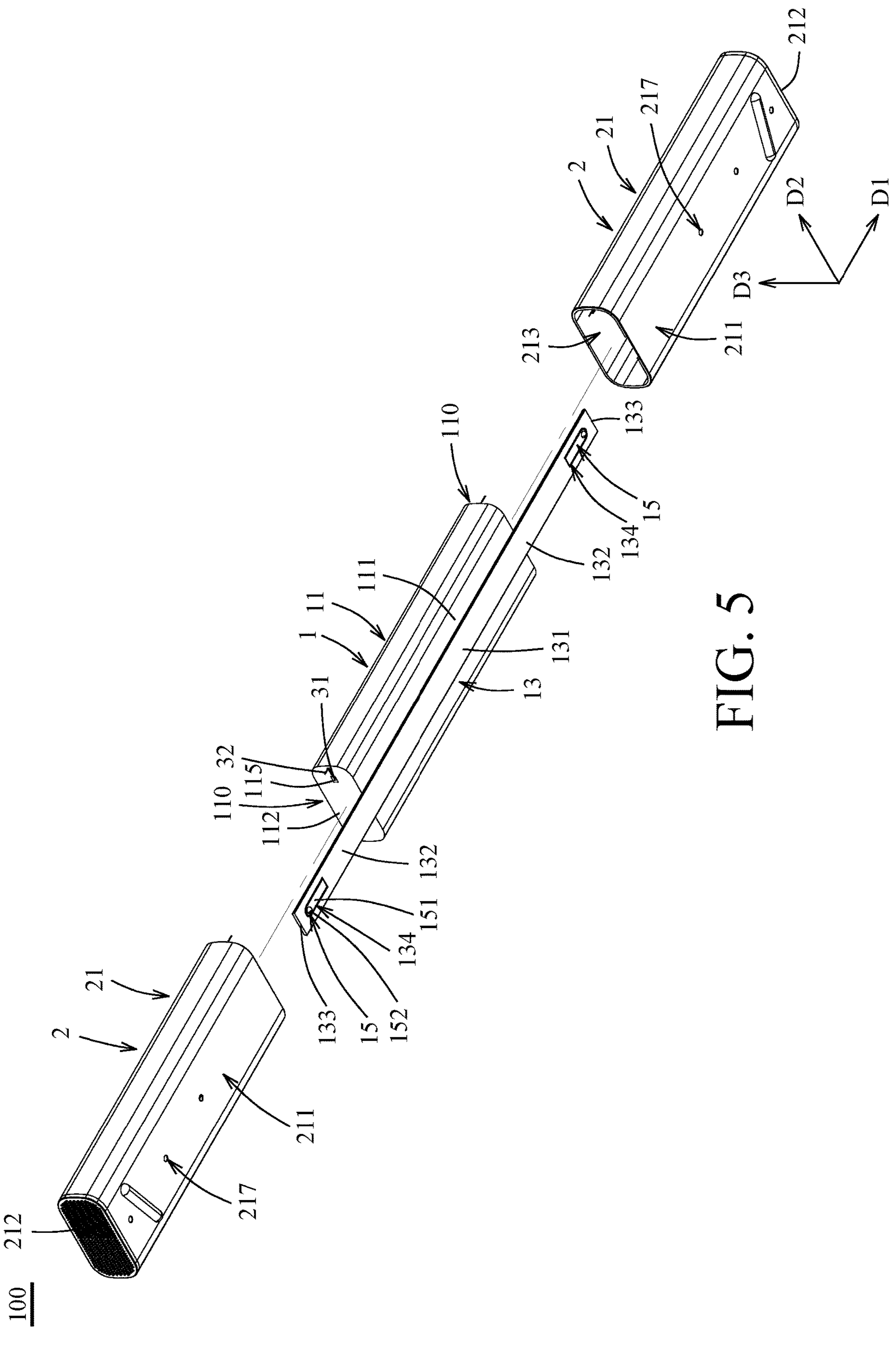
FIG. 5 is an exploded perspective view of the first embodiment taken from another angle.
Figure 6:
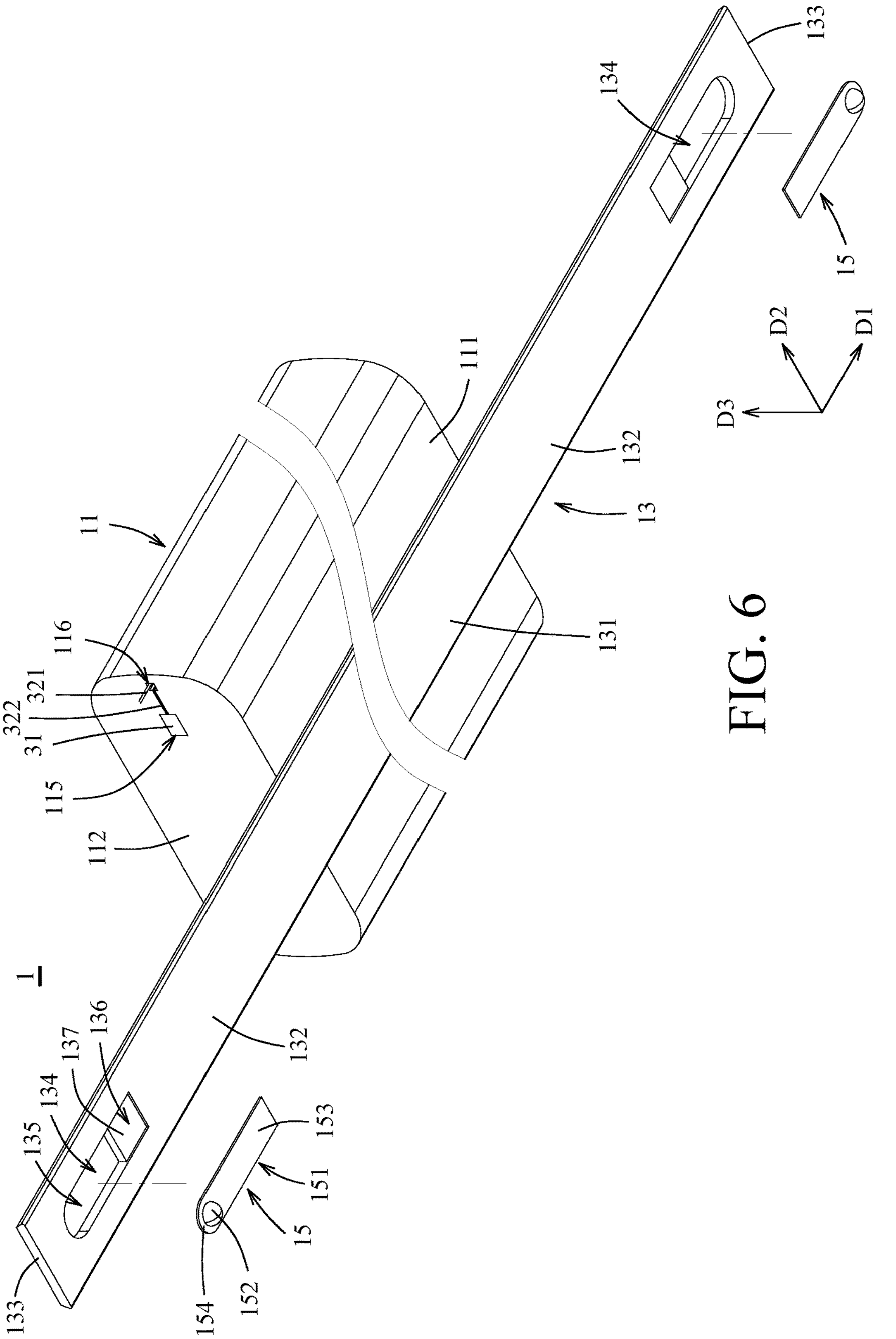
FIG. 6 is a fragmentary exploded perspective view of the guiding device of the first embodiment.
Figure 7:
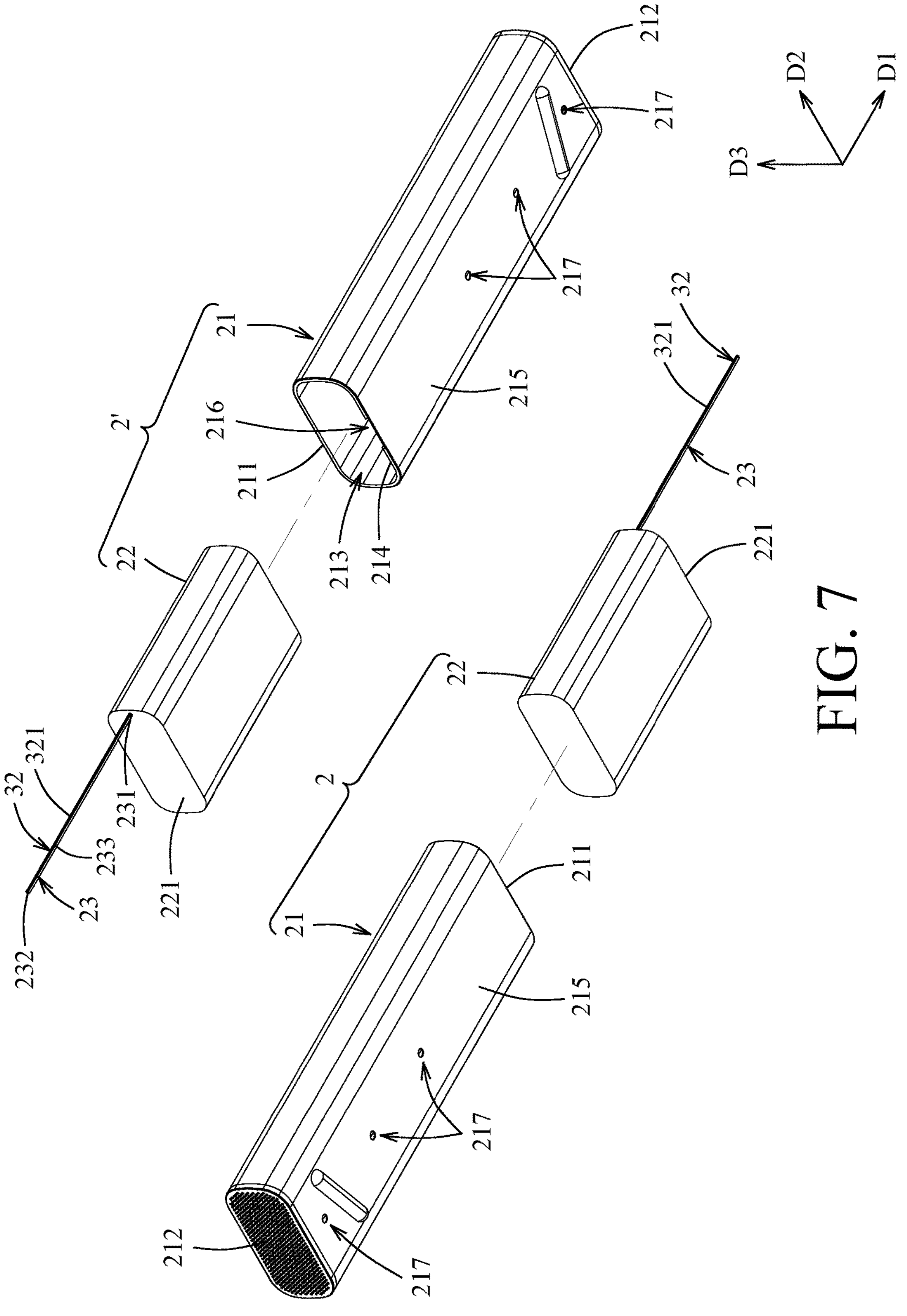
FIG. 7 is an exploded perspective view of each of the first and second speaker devices of the first embodiment.

With reference to FIGS. 3, 5 and 7, the speaker module 22 is disposed in the sliding space 213 of the sliding shell 21 adjacent to the side wall 212, and has a sidewall 221 opposite to the sidewall 212. The push rod 23 is disposed on the sidewall 221, and has a length extending in the length direction (D1). The push rod 23 has a fixed end 231, a push end 232, and a holding portion 233 between the fixed end 231 and the push end 232. The fixed end 231 is fixedly connected to the sidewall 221 by, for example, welding. The push end 232 is a free end opposite to the fixed end 231, and is inserted into the accommodating chamber 114 through a corresponding side opening 116 of the receiving space 113.

Referring again to FIGS. 3 to 7, each transmission line 3 includes a plug connector 31 and a transmission line body 32. The plug connector 31 is inserted into a corresponding side socket 115 of the receiving space 113, and is electrically connected to a corresponding connector 121. The transmission line body 32 has one end connected to the plug connector 31, and the other end electrically connected to the speaker module 22. The transmission line body 32 has a held section 321 and a non-held section 322. The held section 321 has the same length as the push rod 23, and is held by and abuts against the holding portion 233 of the push rod 23. The holding portion 233 is adhered to the held section 321 by, for example, glue or adhesive tape, so as to hold the held section 321, so that the held section 321 can remain in a straight state without bending and deforming. The non-held section 322 is connected between the held section 321 and the plug connector 31, and has a major portion located in the accommodating chamber 114. The non-held section 322 is not held by the push rod 23, and can be pushed by the push end 232.

Figure 9:
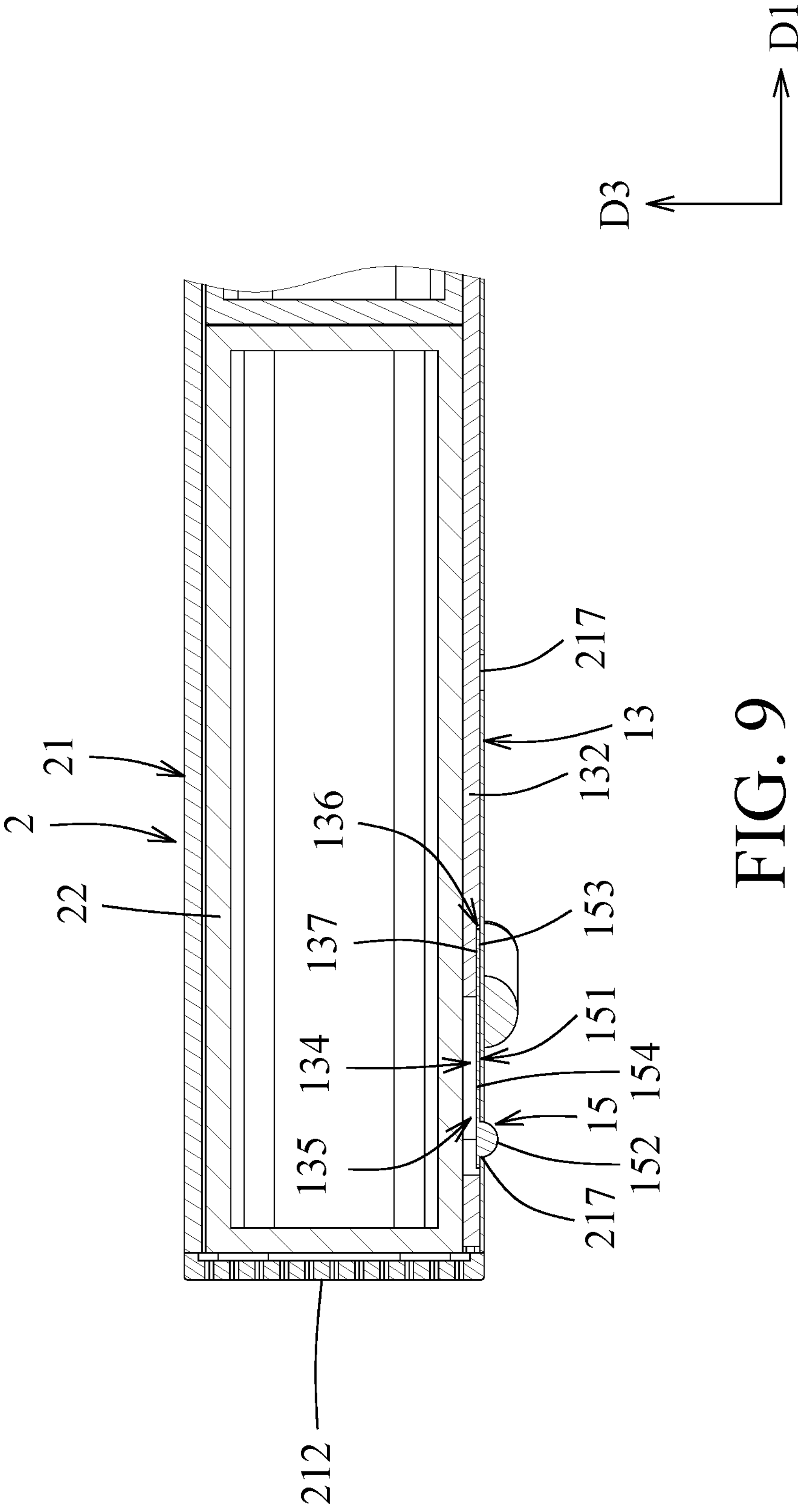
FIG. 9 is an enlarged sectional view of a portion of FIG. 2.

Referring to FIG. 9, in combination with FIGS. 1 and 2, when each of the first and second speaker devices 2, 2' is in the retracted position, the speaker modules 22 of the first and second speaker devices 2, 2' respectively abut against the side walls 112 of the half housing portions 110, and the half housing portions 110 are respectively received in the sliding spaces 213 of the sliding shells 21 of the first and second speaker devices 2, 2'. Furthermore, the locking protrusion 152 of each resilient locking member 15 is engaged with an outermost one of the positioning holes 217 which is close to the side wall 212 of the respective one of the first and second speaker devices 2, 2' for locking the first or second speaker device 2, 2' in the retracted position. At this time, a length of the telescopic soundbar 100 in the length direction (D1) is shortest, and a distance between the speaker modules 22 of the first and second speaker devices 2, 2' in the length direction (D1) is also shortest.

Figure 10:
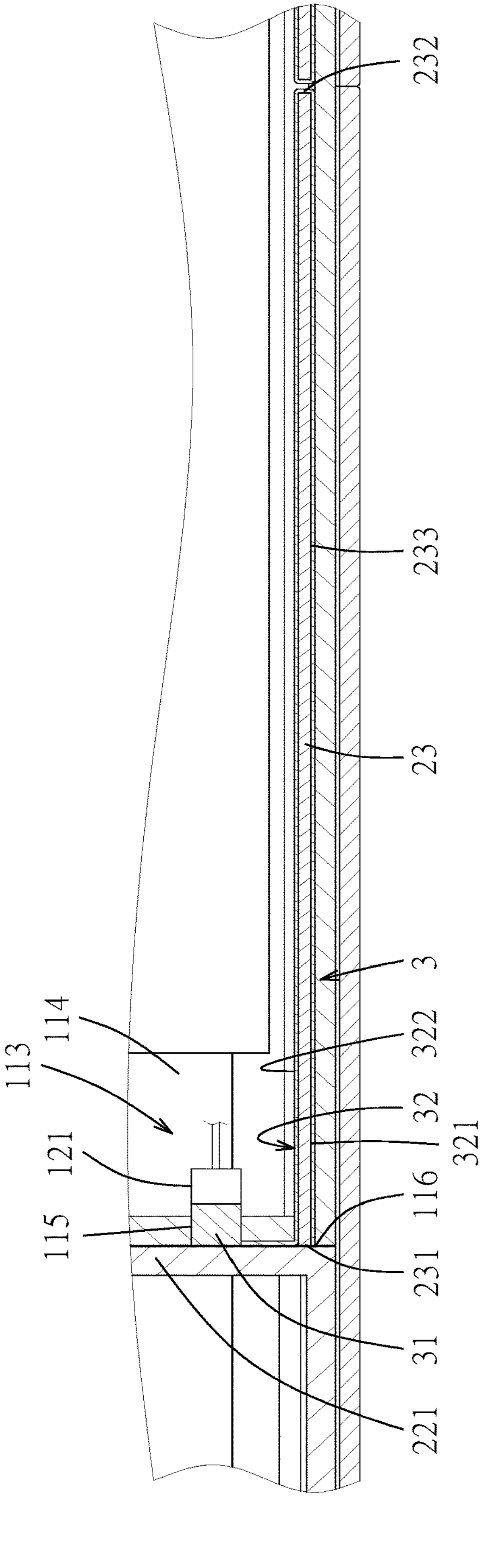
FIG. 10 is an enlarged fragmentary sectional view of a portion of FIG. 3.

Referring to FIG. 10, in combination with FIG. 3, when each of the first and second speaker devices 2, 2' is in the retracted position, the push rod 23 of each of the first and second speaker devices 2, 2' extends through the corresponding side opening 116 into the accommodating chamber 114, the push rod 23 and the held section 321 of the corresponding transmission line 3 held by the holding portion 233 thereof are located in the corresponding side opening 116 and the accommodating chamber 114, and the push end 232 of the push rod 23 pushes the non-held section 322 of the corresponding transmission line 3, such that the non-held section 322 abuts against the push end 232, is located on a side of the push rod 23 that is opposite to the holding portion 233, and is in a tightened state.

Figure 11:
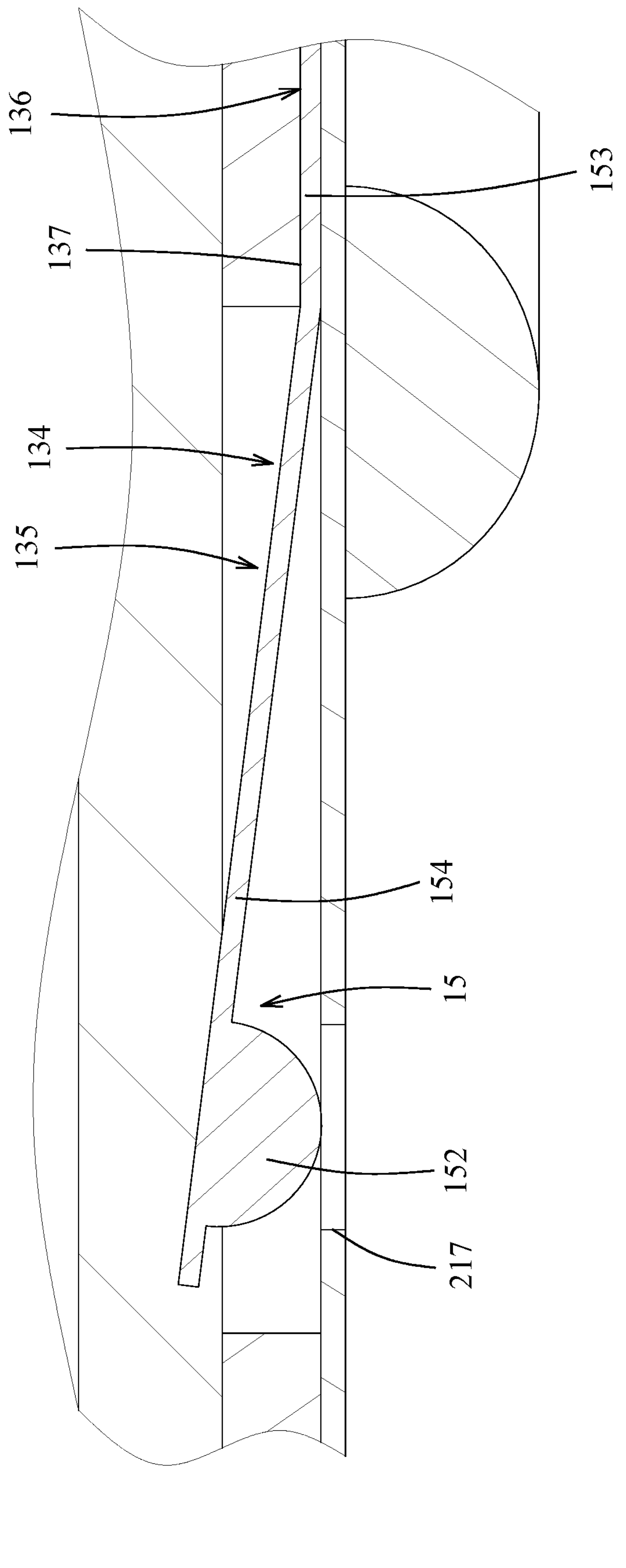
FIG. 11 is an enlarged fragmentary sectional view of the first embodiment, illustrating a locking protrusion of a resilient locking member being moved away from a positioning hole.
Figure 12:
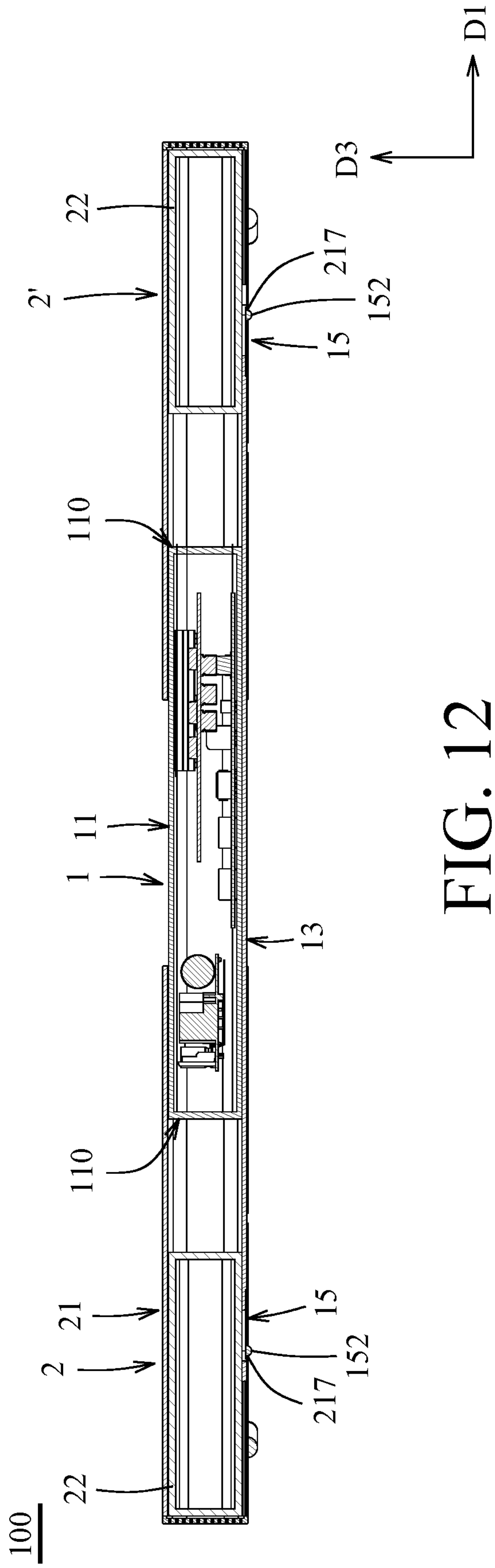
FIG. 12 is a view similar to FIG. 2, but with each of the first and second speaker devices in a half extended position.

Referring to FIGS. 11 and 12, to slide each of the first and second speaker devices 2, 2' from the retracted position to the half extended position, it is necessary to first press upward the locking protrusion 152 of each resilient locking member 15, which in turn drives the hanging plate body 154 to bend and deform relative to the connecting plate body 153 and store a restoring force. When the locking protrusion 152 extends into the through hole portion 135 and is moved entirely out of the outermost positioning hole 217, a locking state of the locking protrusion 152 is released.

Then, the first and second speaker devices 2, 2' are pulled to slide outwardly relative to the guiding device 1 and move oppositely away from each other along the length direction (D1). When a middle one of the positioning holes 217 in each sliding shell 21 is aligned with the locking protrusion 152 of each resilient locking member 15, the hanging plate body 154 of each resilient locking member 15 rebounds through the stored restoring force thereof, so that the locking protrusion 152 automatically extends through the through hole portion 135 and engages the middle positioning hole 217. Through this, each resilient locking member 15 locks the respective one of the first and second speaker devices 2, 2' in the half extended position. At this time, the length of the telescopic soundbar 100 and the distance between the speaker modules 22 of the first and second speaker devices 2, 2' in the length direction (D1) all become longer than when each of the first and second speaker devices 2, 2' is in the retracted position, and the speaker modules 22 of the first and second speaker devices 2, 2' are spaced apart from the respective half housing portions 110.

Figure 13:
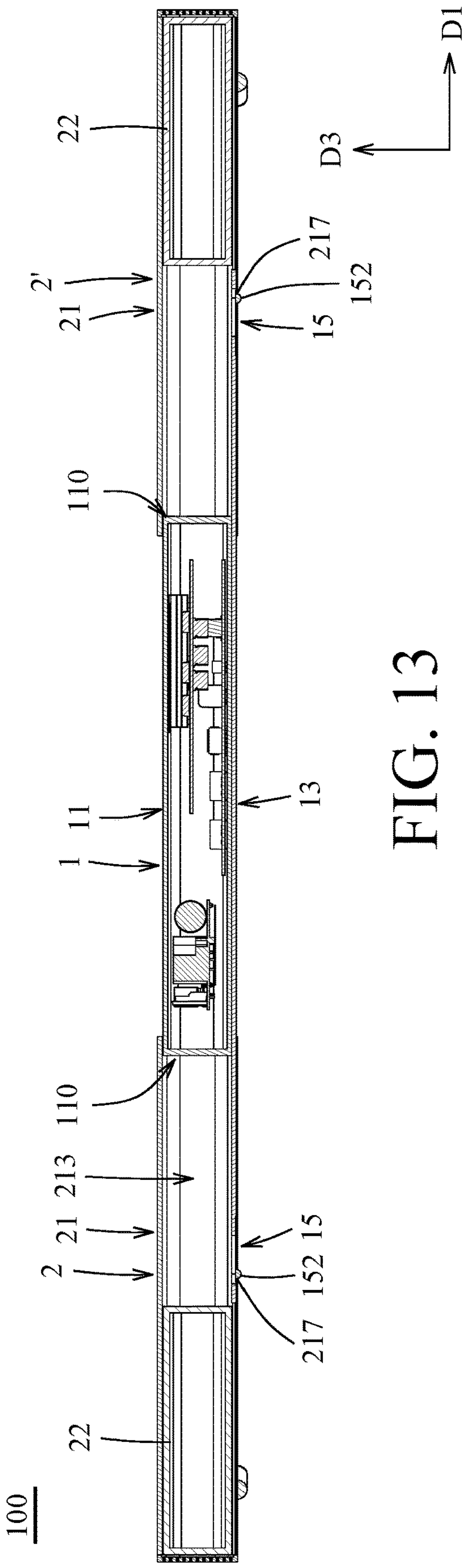
FIG. 13 is a view similar to FIG. 2, but with each of the first and second speaker devices in a fully extended position.
Figure 14:
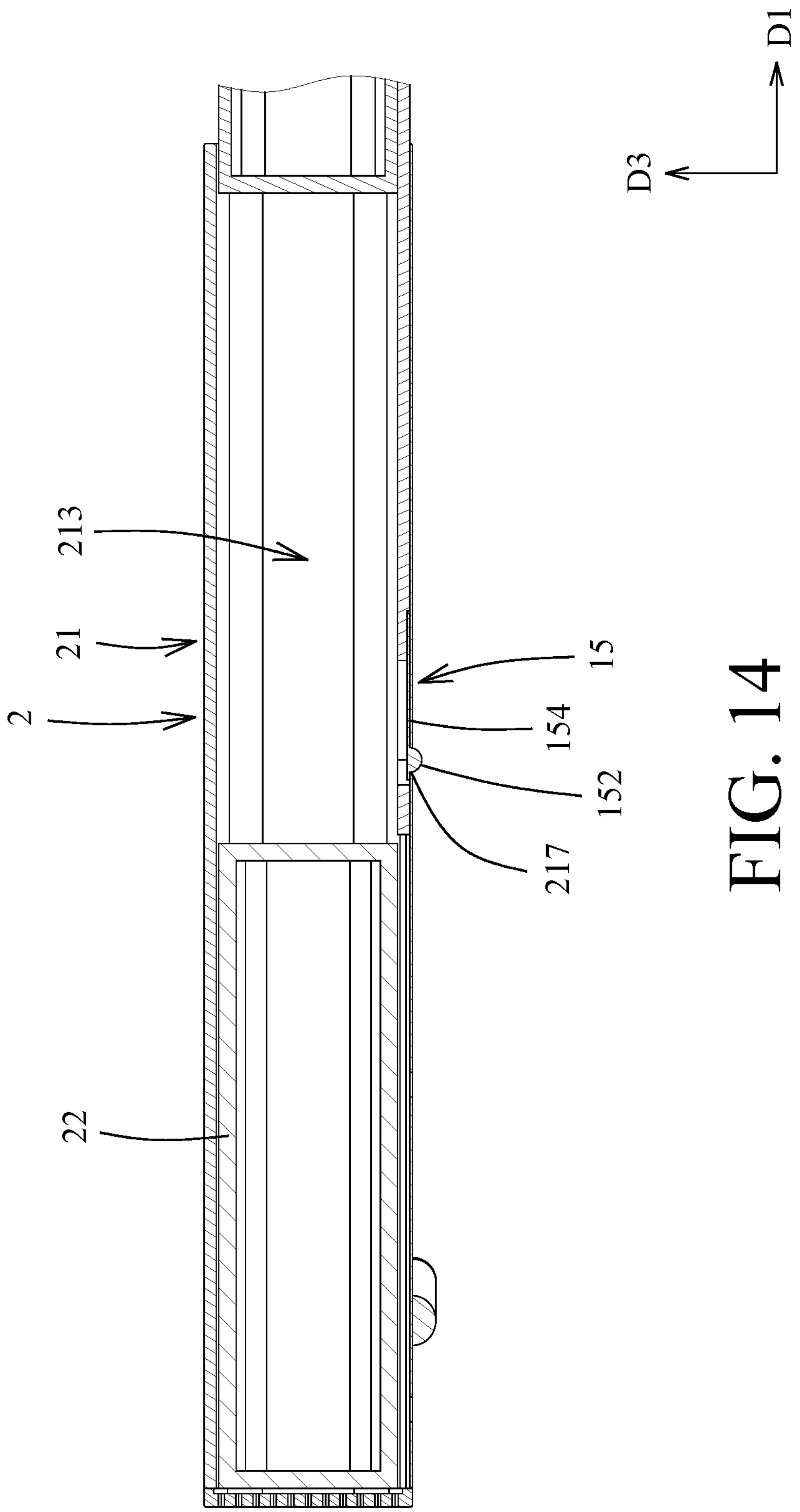
FIG. 14 is an enlarged sectional view of a portion of FIG. 13.

Referring to FIGS. 13 and 14, in combination with FIG. 11, to slide each of the first and second speaker devices 2, 2' from the half extended position to the fully extended position, the locking state of the locking protrusion 152 of each resilient locking member 15 is first released through the aforementioned operation. That is, the locking protrusion 152 of each resilient locking member 15 is pressed upwardly to move out of the middle positioning hole 217 and drive the hanging plate body 154 to deform and store a restoring force. Subsequently, the first and second speaker devices 2, 2' are pulled to slide outwardly relative to the guiding device 1 and move oppositely away from each other. When an innermost one of the positioning holes 217 in each sliding shell 21 is aligned with the locking protrusion 152 of each resilient locking member 15, the hanging plate body 154 of each resilient locking member 15 rebounds through the stored restoring force thereof so that the locking protrusion 152 automatically extends through the through hole portion 135 and engages the innermost positioning hole 217. Through this, each resilient locking member 15 locks the respective one of the first and second speaker devices 2, 2' in the fully extended position. At this time, the speaker modules 22 of the first and second speaker devices 2, 2' are remote from the respective half housing portions 110, and the half housing portions 110 are mostly exposed to the outside. Furthermore, The length of the telescopic soundbar 100 in the length direction (D1) is longest, and the distance between the speaker modules 22 of the first and second speaker devices 2, 2' in the length direction (D1) is also longest.

Figure 15:
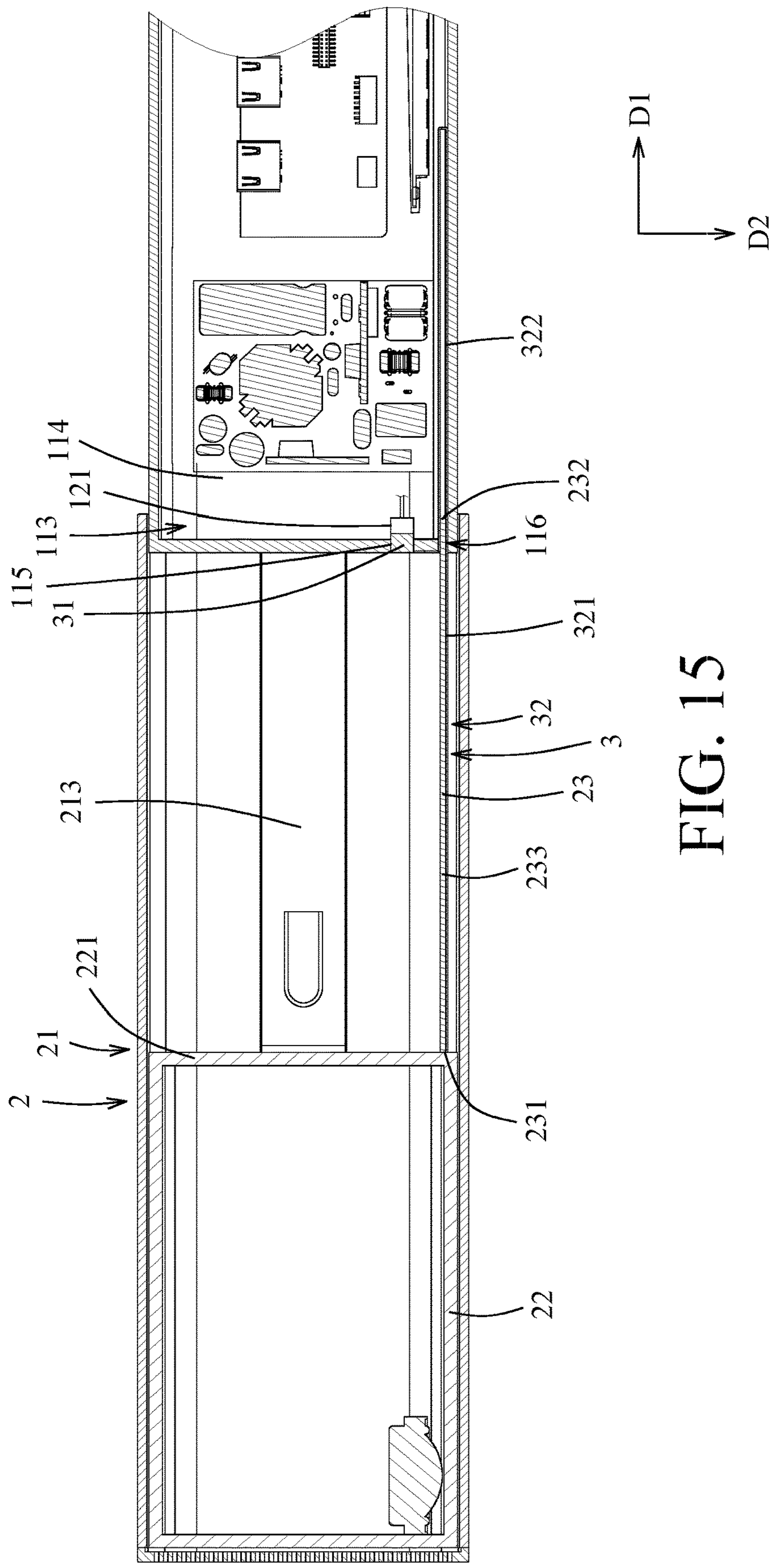
FIG. 15 is an enlarged fragmentary sectional view of FIG. 3, but with the first speaker device in the fully extended position.

Referring to FIG. 15, in combination with FIG. 13, during the outward sliding movement of each of the first and second speaker devices 2, 2', the push rod 23 of each of the first and second speaker devices 2, 2' drives the held section 321 of the corresponding transmission line 3 to gradually protrude out of the corresponding side opening 116 and away from the accommodating chamber 114, and the push end 232 thereof is moved away from the non-held section 322, so that the non-held section 322 is in a relaxed state. When each of the first and second speaker devices 2, 2' is in the fully extended position, the push rod 23 drives the held section 321 of the corresponding transmission line 3 to protrude out of the receiving space 113 to the longest length.

Referring again to FIGS. 11 and 13, to slide each of the first and second speaker devices 2, 2' inwardly from the fully extended position, the locking state of the locking protrusion 152 of each resilient locking member 15 is first released through the aforementioned operation, after which the first and second speaker devices 2, 2' are pushed to slide inwardly relative to the guiding device 1 toward each other. In this way, each of the first and second speaker devices 2, 2' can be positioned in the half extended position shown in FIG. 12 or the retracted position shown in FIG. 2 according to the requirements.

With reference to FIGS. 10, 13 and 15, during the inward sliding movement of each of the first and second speaker devices 2, 2' from the fully extended position to the retracted position, the push rod 23 of each of the first and second speaker devices 2, 2' drives the held section 321 of the corresponding transmission line 3 to gradually extend into the accommodating chamber 114 of the receiving space 113. When the push end 232 of the push rod 23 contacts the non-held section 322 of the corresponding transmission line 3, the push end 232 will push the non-held section 322 inwardly. When each of the first and second speaker devices 2, 2' is in the retracted position, the push end 232 pushes the non-held section 322 to return to the tightened state.

When each of the first and second speaker devices 2, 2' is in the fully extended position or the half extended position, the holding portion 233 of the push rod 23 holds the held section 321, so that the held section 321 extending out of the receiving space 113 can be kept flat and will not bend in the sliding space 213. Through this, when each of the first and second speaker devices 2, 2' slides inwardly from the fully or half extended position to the retracted position, the speaker module 22 thereof will not be blocked by the bent held section 321 or will not press against the bent held section 321, so that each of the first and second speaker devices 2, 2' can smoothly return to the retracted position, thereby enhancing the convenience of operation. Furthermore, when each of the first and second speaker devices 2, 2' is slid to the half or fully extended position, the held section 321 of each transmission line 3 is received in the sliding space 213 and is covered by the sliding shell 21, so that each transmission line 3 is prevented from being exposed to enhance the overall aesthetic appearance of the telescopic soundbar 100.

With reference to FIGS. 2, 12 and 13, in addition to the aforementioned method of adjusting the length of the telescopic soundbar 100, the following adjustment methods can also be applied:

1. One of the first and second speaker devices 2, 2' is positioned in the retracted position, while the other one of the first and second speaker devices 2,2' is slid to the half or fully extended position so that the telescopic soundbar 100 further has two different length variations.
2. One of the first and second speaker devices 2, 2' is positioned in the half extended position, while the other one of the first and second speaker devices 2, 2' is slid to the fully extended position so that the telescopic soundbar 100 further has another different length variation.

With each of the first and second speaker devices 2, 2' being a sliding speaker device that is slidably connected to the guiding device 1 and that is slidable between three different positions, namely the retracted position, the half extended position, and the fully extended position, the user can adjust and change the length of the telescopic soundbar 100 to match a length of a television, improve the sound performance thereof, etc., according to his/her requirements, thereby increasing the flexibility of use of this disclosure. In addition, by adjusting and positioning each of the first and second speaker devices 2, 2' in the fully extended position, the length of the telescopic soundbar 100 can be adjusted to the longest, so that the telescopic soundbar 100 can create a wider sound field, thereby providing the user with a better sound experience. Furthermore, by adjusting and positioning each of the first and second speaker devices 2, 2' in the retracted position, the length of the telescopic soundbar 100 can be adjusted to the shortest, thereby enabling a packaging box to load a greater number of the telescopic soundbar 100 to increase and optimize the loading capacity thereof. Accordingly, a telescopic design of the telescopic soundbar 100 can simultaneously satisfy the requirements of improving the sound performance thereof and optimizing the loading capacity of the packaging box.

Through the cooperation of the sliding shell 21 and the elongated housing 11 and the cooperation of the slide groove 216 and the guide rail 13, the sliding shell 21 can slide stably along the length direction (D1). With the protruding sections 132 of the guide rail 13 respectively protruding out of the side walls 112 of the elongated housing 11 and received slidably and respectively in the slide grooves 216 of the sliding shells 21 of the first and second speaker devices 2, 2', wobbling of the sliding shells 21 during sliding movement thereof can be prevented, thereby enhancing the stability of the sliding movement of the sliding shells 21. Furthermore, with the length of each sliding shell 21 being designed so that the sliding space 213 thereof can simultaneously receive the speaker module 22 and the corresponding half housing portion 110, the sliding shell 21 can slide over a long distance relative to the elongated housing 11, thereby increasing the overall length of the telescopic soundbar 100 when each of the first and second speaker devices 2, 2' is slid to the fully extended position. Moreover, when each of the first and second speaker devices 2, 2' is in the retracted position, the guiding device 1 can be concealed entirely in the sliding spaces 213 of the sliding shells 21 of the first and second speaker devices 2, 2'. Additionally, because each protruding section 132 of the guide rail 13 is formed with the receiving slot 134 for receiving the resilient plate 151 of the respective resilient locking member 15, the overall thickness of each resilient locking member 15 after being assembled on the guide rail 13 can be reduced.

It should be noted that, in another implementation of the first embodiment, one of the first and second speaker devices 2, 2' may be a fixed speaker device fixedly connected to the guiding device 1, while the other one of the first and second speaker devices 2, 2' is a sliding speaker device. Through this, the effect of adjusting the length of the telescopic soundbar 100 can also be achieved.

Figure 16:
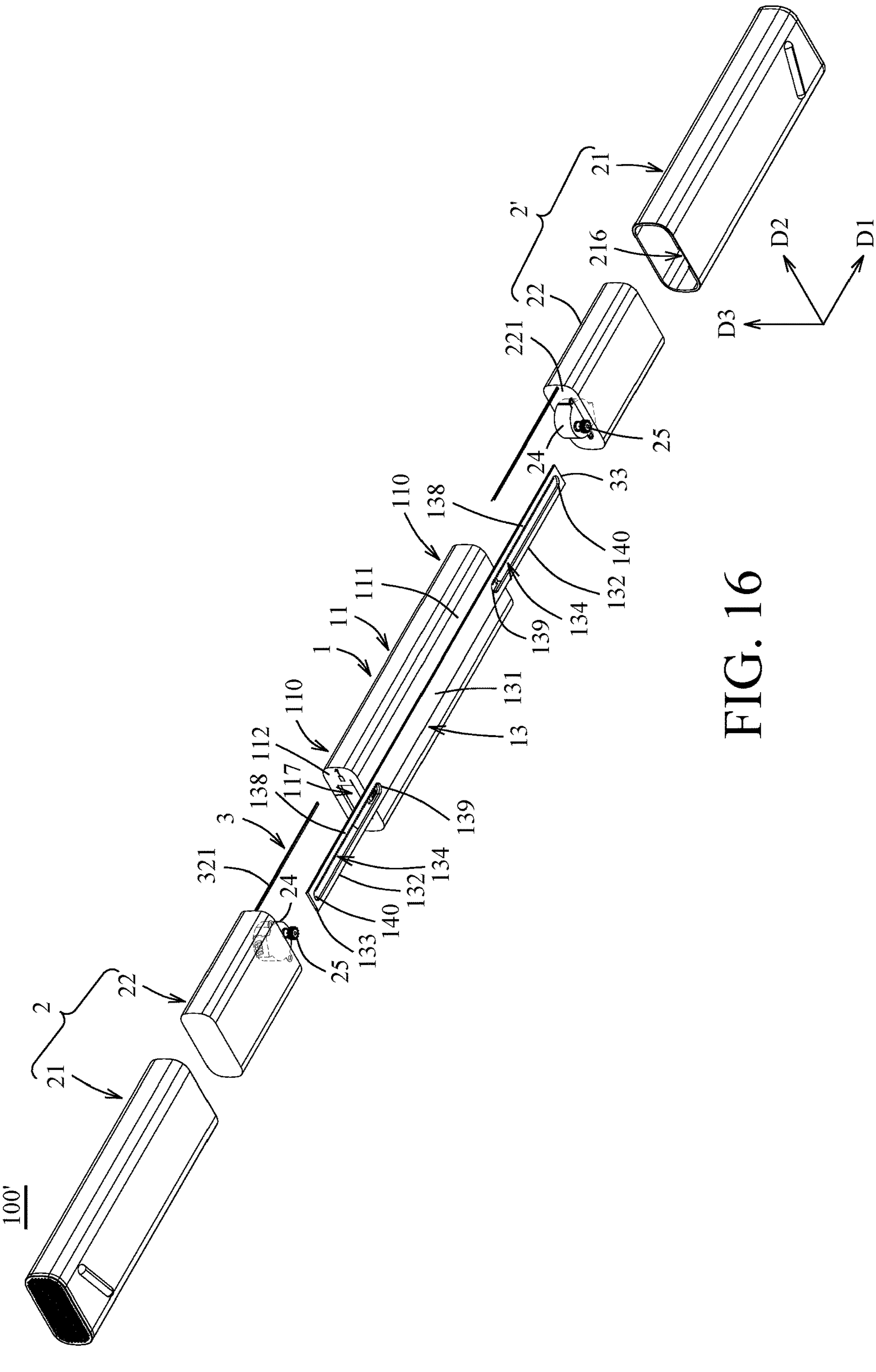
FIG. 16 is an exploded perspective view of a telescopic soundbar according to the second embodiment of the present disclosure.
Figure 17:
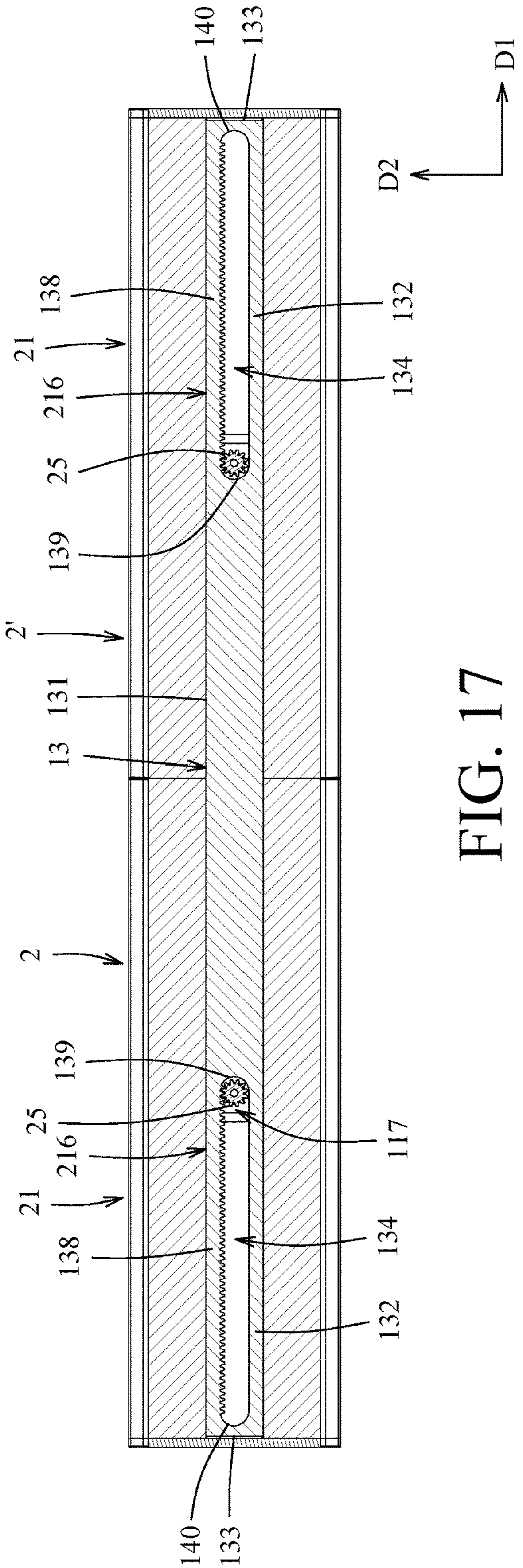
FIG. 17 is an assembled sectional view of the second embodiment, illustrating each of the first and second speaker devices in the retracted position.

Referring to FIGS. 16 and 17, the second embodiment of the telescopic soundbar 100' of this disclosure is shown to have an overall structure substantially the same as the first embodiment, and only differs in the sliding movement operation of the first and second speaker devices 2, 2'.

In this embodiment, each side wall 112 and the lower wall 111 of the elongated housing 11 cooperatively form a side opening 117 communicating with the receiving space 113 (see FIG. 2). The connecting section 131 of the guide rail 13 cooperates with the corresponding protruding section 132 to define the receiving slot 134 extending along the length direction (D1). The receiving slot 134 has one side formed with a rack portion 138. The rack portion 138 has a plurality of teeth facing the receiving slot 134. The guide rail 13 further has two first stop faces 139 and two second stop faces 140. Each first stop face 139 and the corresponding second stop face 140 are located on two opposite ends of the receiving slot 134. Each second stop face 140 is adjacent to the distal end 133 of the respective protruding section 132. That is, each second stop face 140 is located between the distal end 133 of each protruding section 132 and a respective one of the first stop faces 139.

Each of the first and second speaker devices 2, 2' further includes a motor 24 and a gear 25. The motor 24 is disposed on and partially protrudes out of the sidewall 221 of the speaker module 22. The motor 24 is electrically connected to the electronic control module 12 (see FIG. 2) through the transmission line 3, and is controlled by the electric control module 12 to operate. The gear 25 is connected to and driven by the motor 24 to rotate. The gear 25 is spaced apart from the sidewall 221, is received in the receiving slot 134, and meshes with the rack portion 138. Each first stop face 139 is configured to stop the gear 25 so as to limit the first or second speaker device 2, 2' in the retracted position. Each second stop face 140 is configured to stop the gear 25 so as to limit the first or second speaker device 2, 2' in the fully extended position.

When each of the first and second speaker devices 2, 2' is in the retracted position, a portion of the motor 24 thereof extends into the receiving space 113 through the corresponding side opening 117, and the gear 25 is received in the corresponding side opening 117. The gears 25 of the first and second speaker devices 2, 2' respectively abut against the first stop faces 139.

Figure 18:
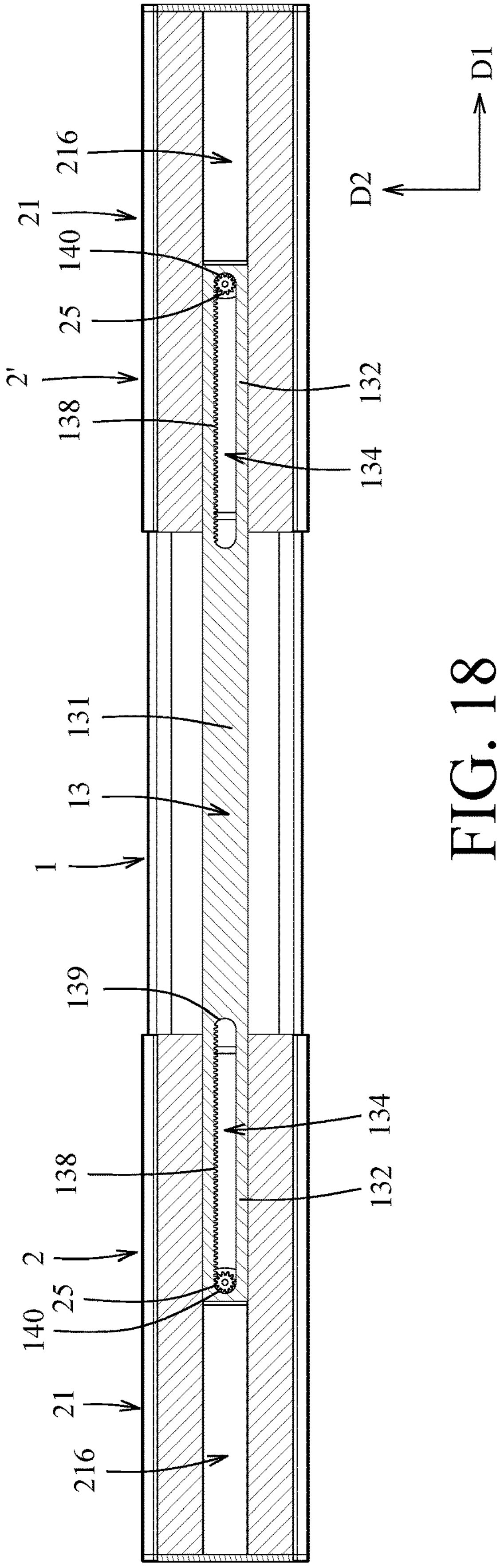
FIG. 18 is a view similar to FIG. 17, but with each of the first and second speaker devices in a fully extended position.
Figure 19:
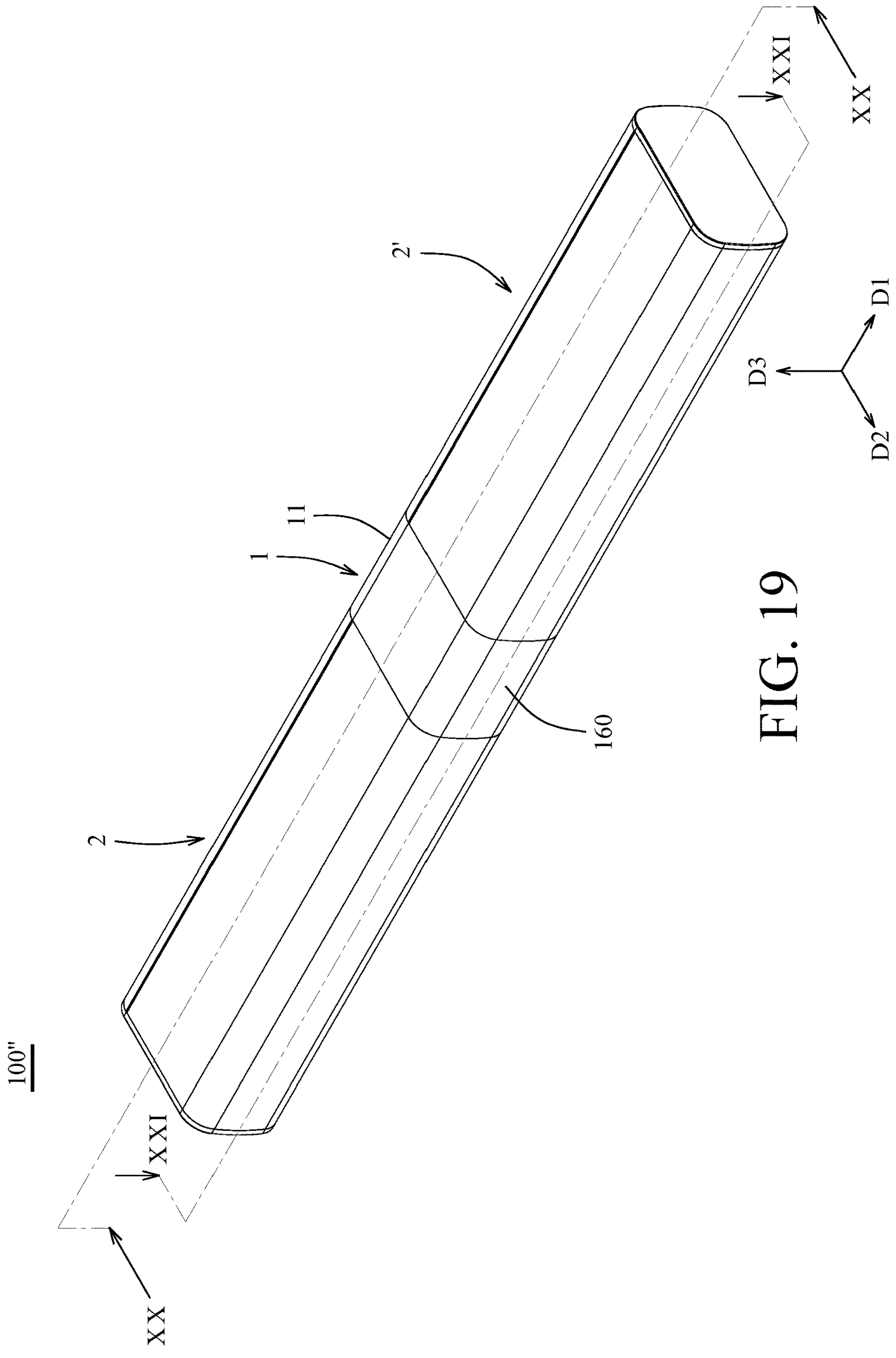
FIG. 19 is a perspective view of a telescopic soundbar according to the third embodiment of the present disclosure.
Figure 20:
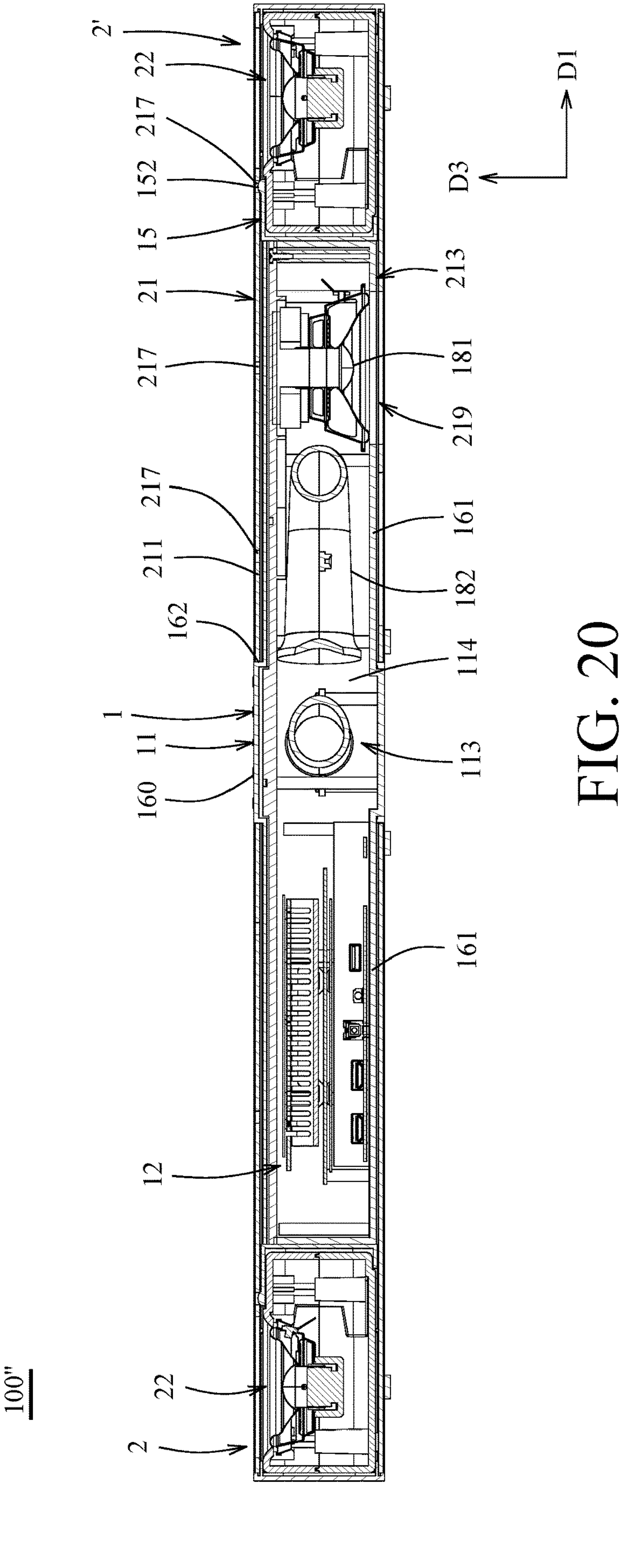
FIG. 20 is a sectional view taken along line XX-XX of FIG. 19.
Figure 21:
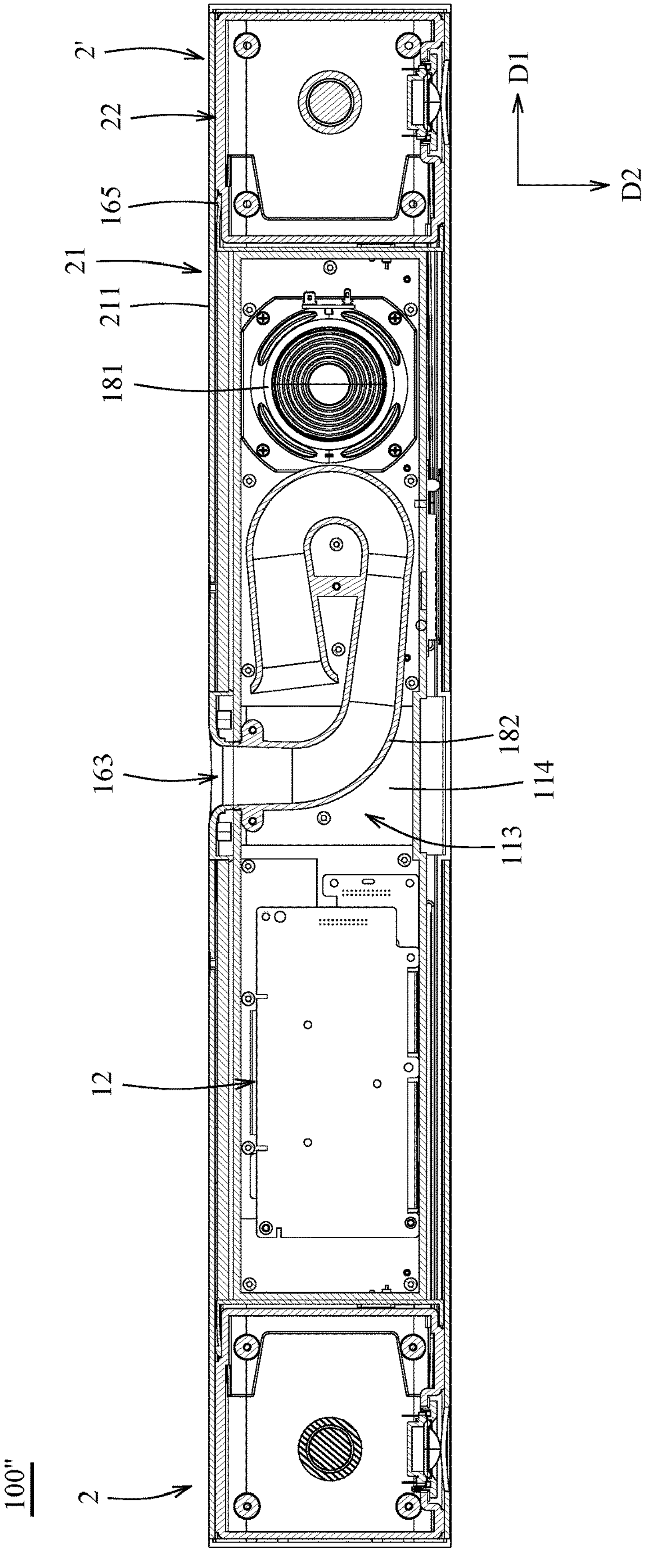
FIG. 21 is a sectional view taken along line XXI-XXI of FIG. 19.
Figure 22:
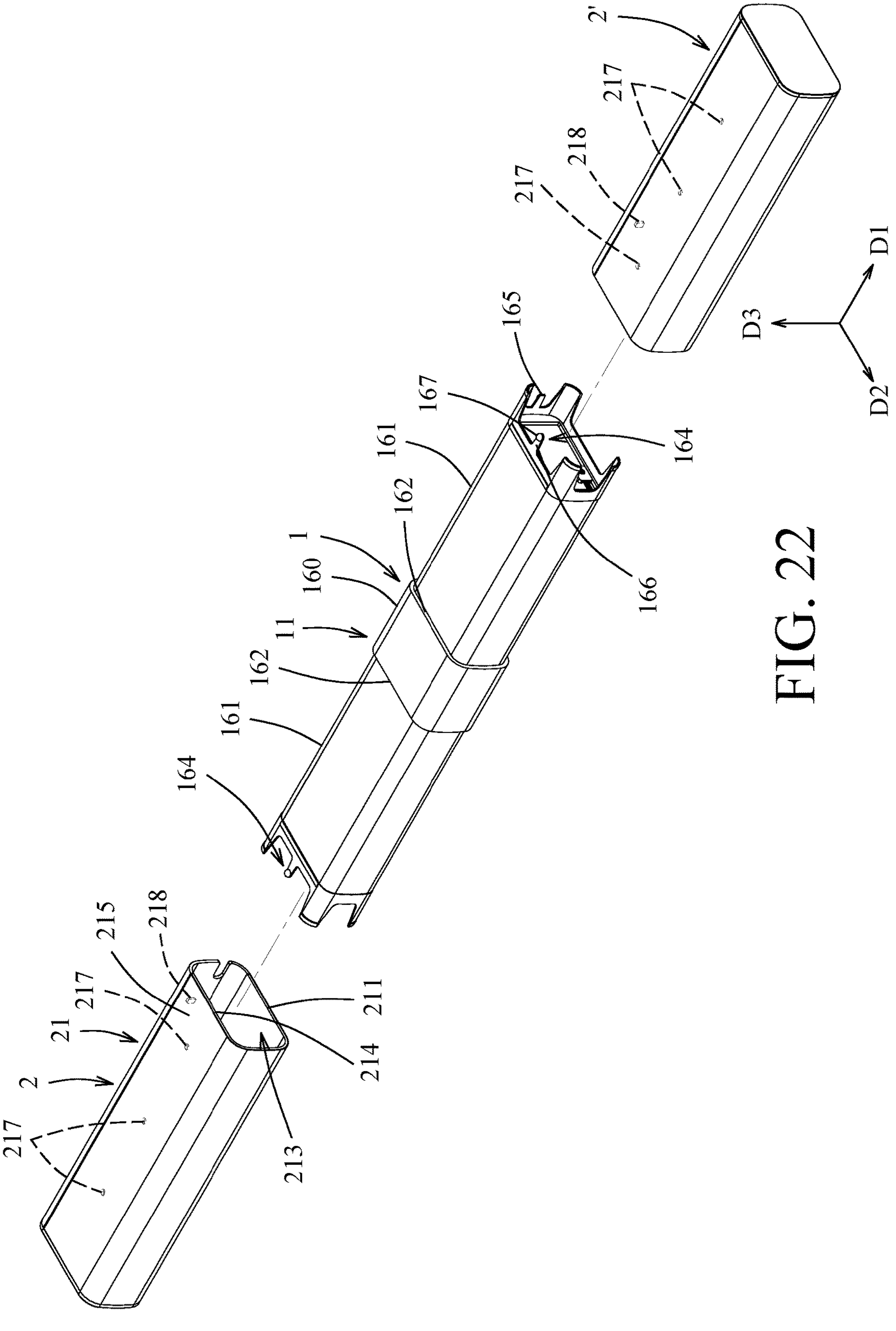
FIG. 22 is an exploded perspective view of the third embodiment.
Figure 23:
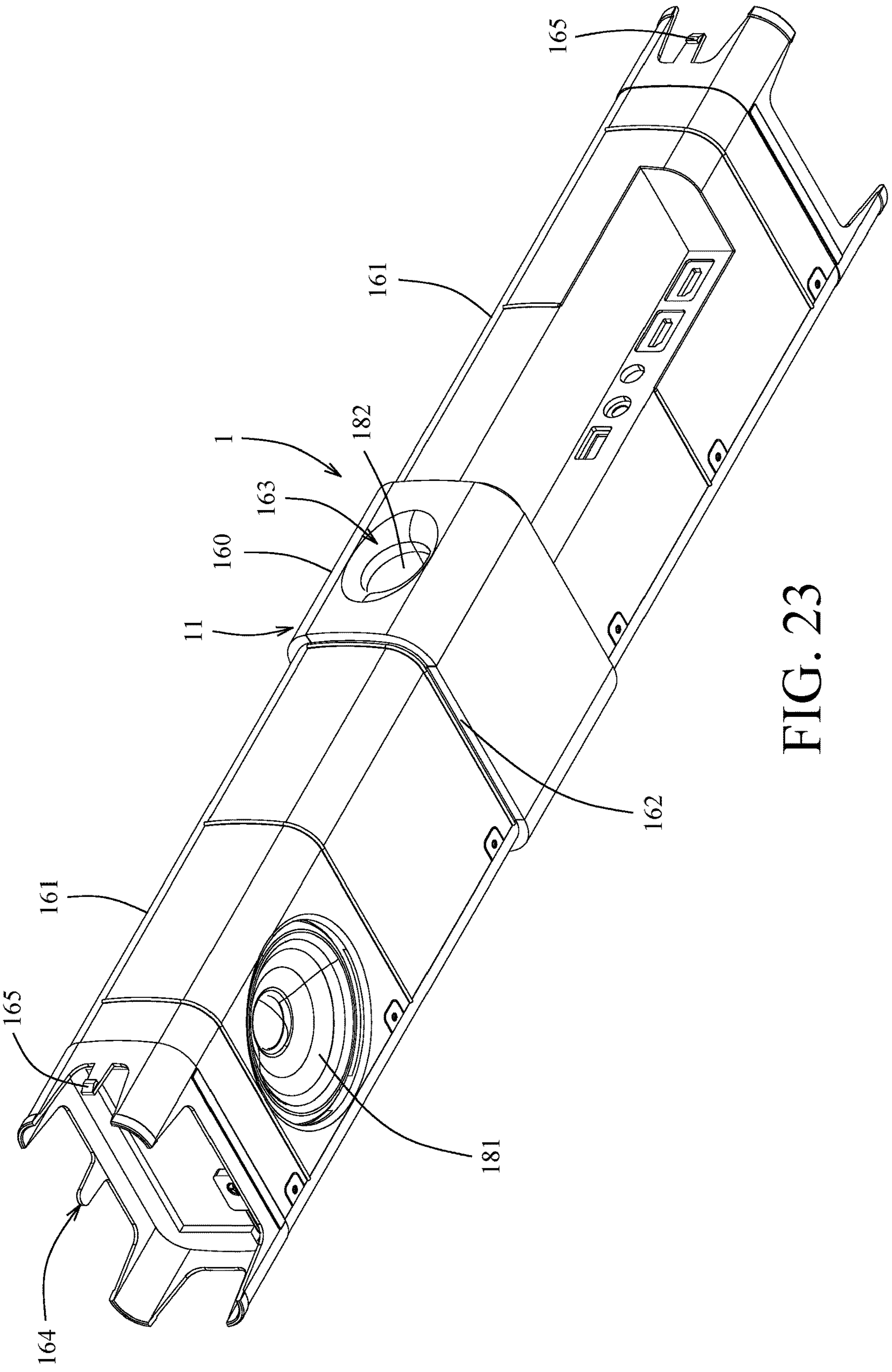
FIG. 23 is an enlarged perspective view of a guiding device of the third embodiment when viewed from another angle.

Referring to FIG. 18, in combination with FIG. 17, to slide each of the first and second speaker devices 2, 2' outwardly from the retracted position, the user can wirelessly control the electronic control module 12 (see FIG. 2) through, for example, a smartphone or a remote controller to operate the motors 24 of the first and second speaker devices 2, 2' to drive outward rotation of the gears 25 thereof. When the gears 25 rotate outwardly, they can move outwardly and respectively along the rack portions 138 of the receiving slots 134 of the guide rail 13, thereby driving the first and second speaker devices 2, 2' to slide outwardly relative to the guiding device 1 away from each other. When the gears 25 contact and stop the respective second stop faces 140, the first and second speaker devices 2, 2' cannot slide further outward and are thus positioned in the fully extended position.

On the contrary, when it is desired to slide each of the first and second speaker devices 2, 2' inwardly from the fully extended position, the user can wirelessly control the electronic control module 12 through the smartphone or the remote controller to operate the motors 24 to drive inward rotation of the gears 25. When the gears 25 rotate inwardly, they can move inwardly along the rack portions 138 of the receiving slots 134 of the guide rail 13, thereby driving the first and second speaker devices 2, 2' to slide inwardly relative to the guiding device 1 toward each other. When the gears 25 contact and stop the respective first stop faces 139, the first and second speaker devices 2, 2' cannot slide further inward and are thus positioned in the retracted position.

During the aforementioned operations, the user can also wirelessly control the electronic control module 12 through the smartphone or the remote controller to stop operation of the motors 24 so as to stop the first and second speaker devices 2, 2' in any selected position between the retracted position and the fully extended position. Through this, the first and second speaker devices 2, 2' of the second embodiment can achieve the effect of stepless positioning, so that more variations can be made when adjusting the length of the telescopic soundbar 100'.

Referring to FIGS. 19 to 23, the third embodiment of the telescopic soundbar 100" of this is shown to have an overall structure substantially the same as the first embodiment. The difference between the third and first embodiments resides in the detailed structures of the guiding device 1 and the first and second speaker devices 2, 2'.

In the third embodiment, the elongated housing 11 has a middle housing portion 160, and two lateral housing portions 161 respectively located on two sides of the middle housing portion 160 that are opposite to each other along the length direction (D1). The middle housing portion 160 and the lateral housing portions 161 cooperatively define the receiving space 113. The middle housing portion 160 has two stop ring surfaces 162 spaced apart along the length direction (D1) and respectively connected to the lateral housing portions 161. The stop ring surfaces 162 are configured to stop the surrounding walls 211 of the sliding shells 21 of the first and second speaker devices 2, 2' so as to position the first and second speaker devices 2, 2' in the retracted position. The middle housing portion 160 is formed with a through hole 163 in a rear side thereof that communicates with the accommodating chamber 114 of the receiving space 113. Each lateral housing portion 161 has a resilient locking member 164 and an engaging hook 165 spaced apart from the corresponding stop ring surface 162 along the length direction (D1). The resilient locking member 164 is located on a top outer end of the lateral housing portion 161, and has a resilient plate 166, and a locking protrusion 167 projecting from a top surface of the resilient plate 166. The engaging hook 165 is disposed on a rear outer end of the lateral housing portion 161.

The guiding device 1 of this embodiment further includes a woofer 181 and a reflection tube 182 disposed in the accommodating chamber 114. The woofer 181 is located, for example, in a left one of the lateral housing portions 161. The reflection tube 182 has one end communicating with the through hole 163 of the middle housing portion 160. With the woofer 181 and the reflection tube 182 disposed inside the elongated housing 11, the guiding device 1 can be used as a bass reflex speaker.

Referring back to FIGS. 20 to 22, the sliding space 213 of the sliding shell 21 of each of the first and second speaker devices 2, 2' is configured to slidably received a respective one of the lateral housing portions 161. A top wall portion of the surrounding wall 211 of the sliding shell 21 of each of the first and second speaker devices 2, 2' is formed with the positioning holes 217 extending from the inner wall surface 214 toward the outer wall surface 215. The locking protrusion 167 of the resilient locking member 164 is engageable with a selected one of the positioning holes 217. A rear wall portion of the surrounding wall 211 of the sliding shell 21 of each of the first and second speaker devices 2, 2' is formed with an engaging slot 218 extending from the inner wall surface 214 toward the outer wall surface 215. The engaging hook 165 is configured to engage with the engaging slot 218 so as to prevent the first or second speaker device 2, 2' from sliding out of the fully extended position.

When each of the first and second speaker devices 2, 2' is in the retracted position, the engaging hook 165 of each lateral housing portion 161 is pressed and deformed by the surrounding wall 211 of the sliding shell 21 of the respective one of the first and second speaker devices 2, 2' so as to store a restoring force, and the surrounding wall 211 of the sliding shell 21 of the second speaker device 2' corresponds in position to the woofer 181 through a sound hole 219 formed therein, so that the speaker module 22 of each of the first and second speaker devices 2, 2' can be used in conjunction with the bass reflex speaker or guiding device 1.

Figure 24:
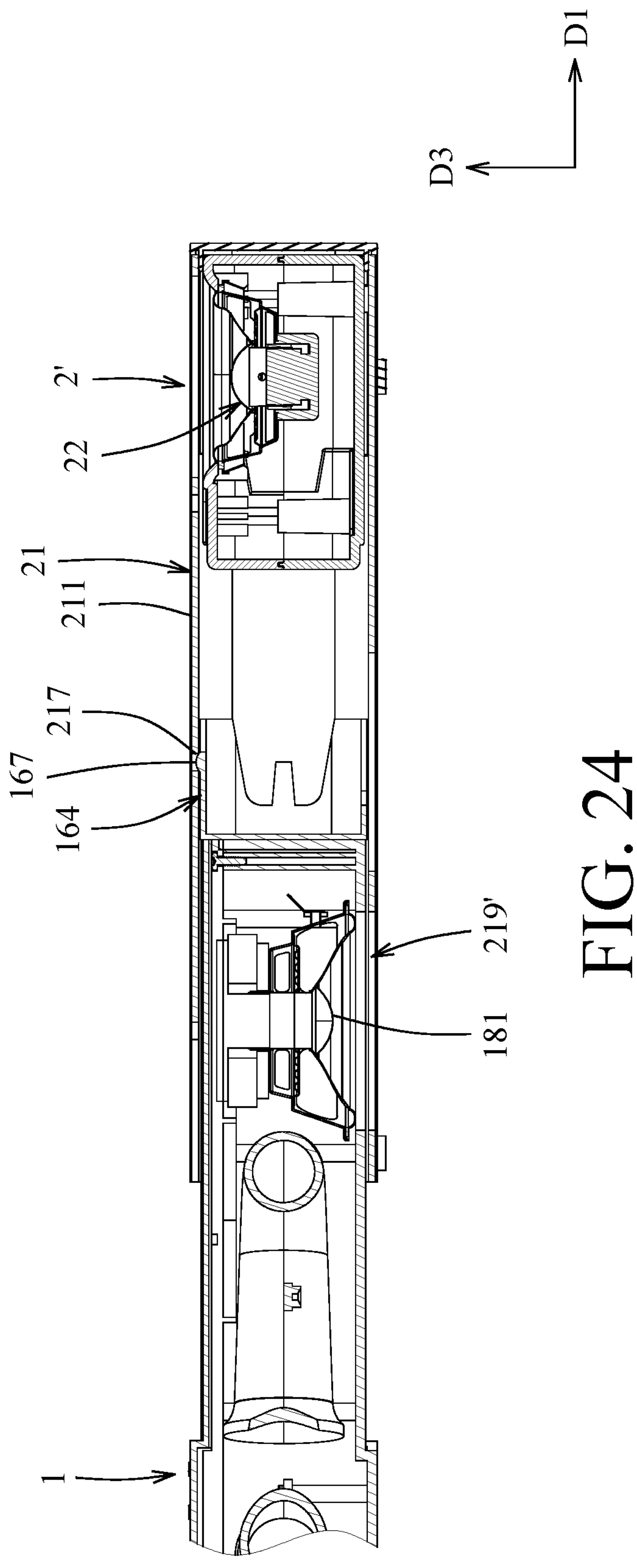
FIG. 24 is a fragmentary sectional view of FIG. 20, but with the second speaker device in a half extended position.

Referring to FIG. 24, when the second speaker device 2' is in the half extended position, the surrounding wall 211 of the sliding shell 21 thereof corresponds in position to the woofer 181 through another sound hole 219' formed therein, so that the speaker module 22 of each of the first and second speaker devices 2, 2' can still be used in conjunction with the bass reflex speaker or guiding device 1.

Figure 25:
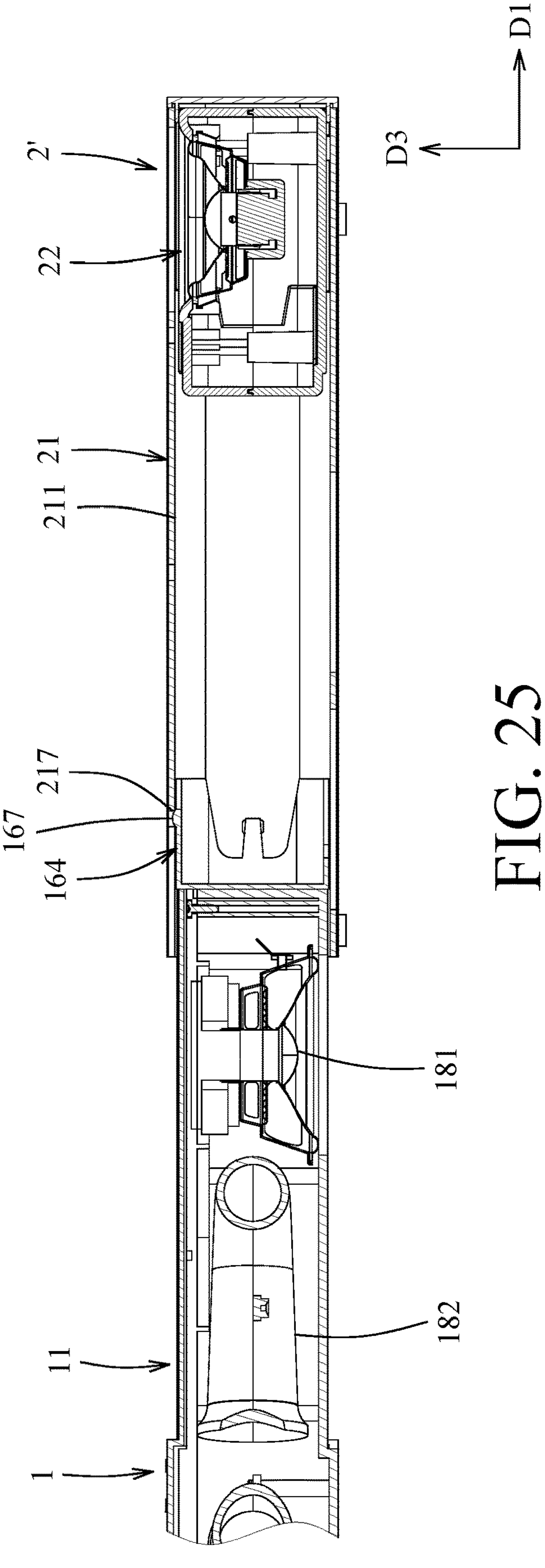
FIG. 25 is another fragmentary sectional view of FIG. 20, but with the second speaker device in a fully extended position.
Figure 26:
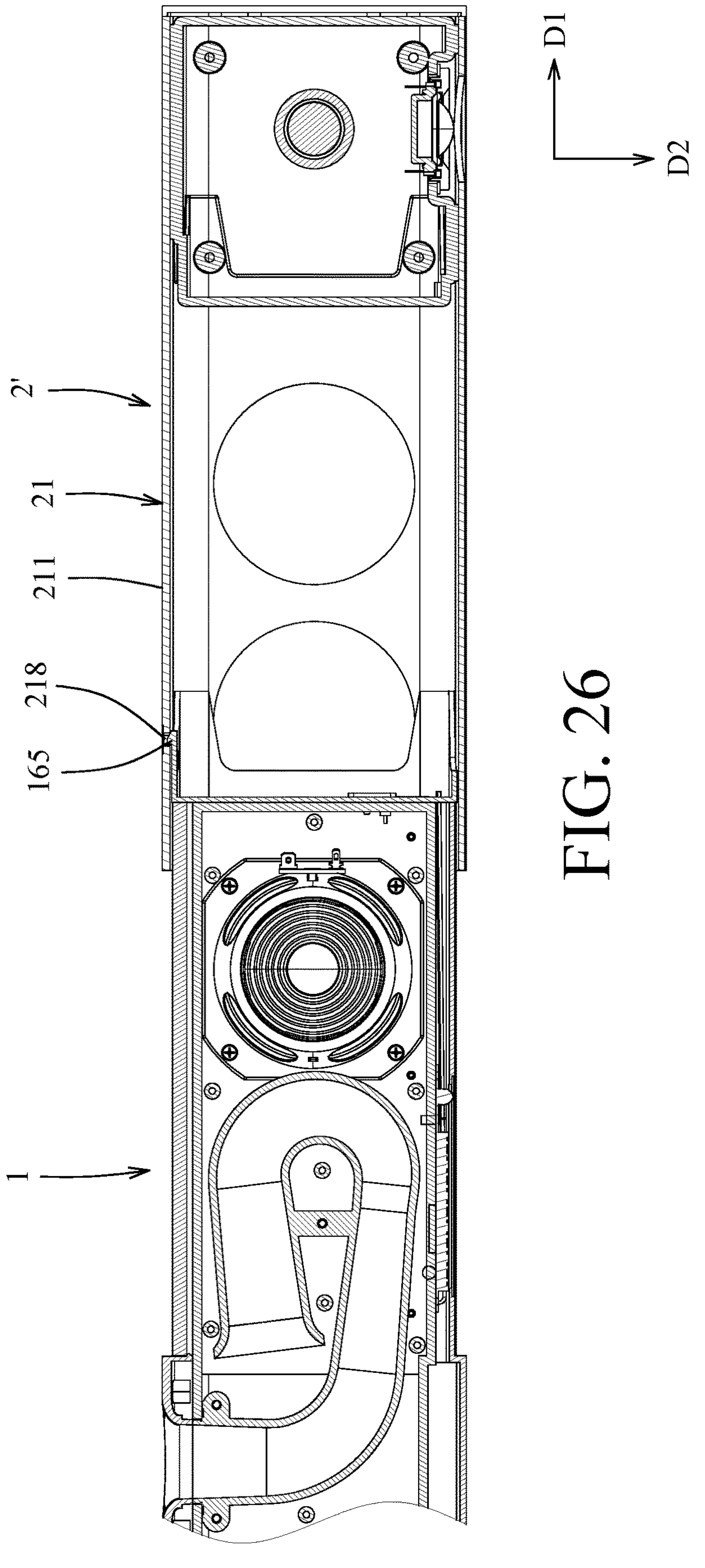
FIG. 26 is a fragmentary sectional view of FIG. 21, but with the second speaker device in the fully extended position.
Figure 27:
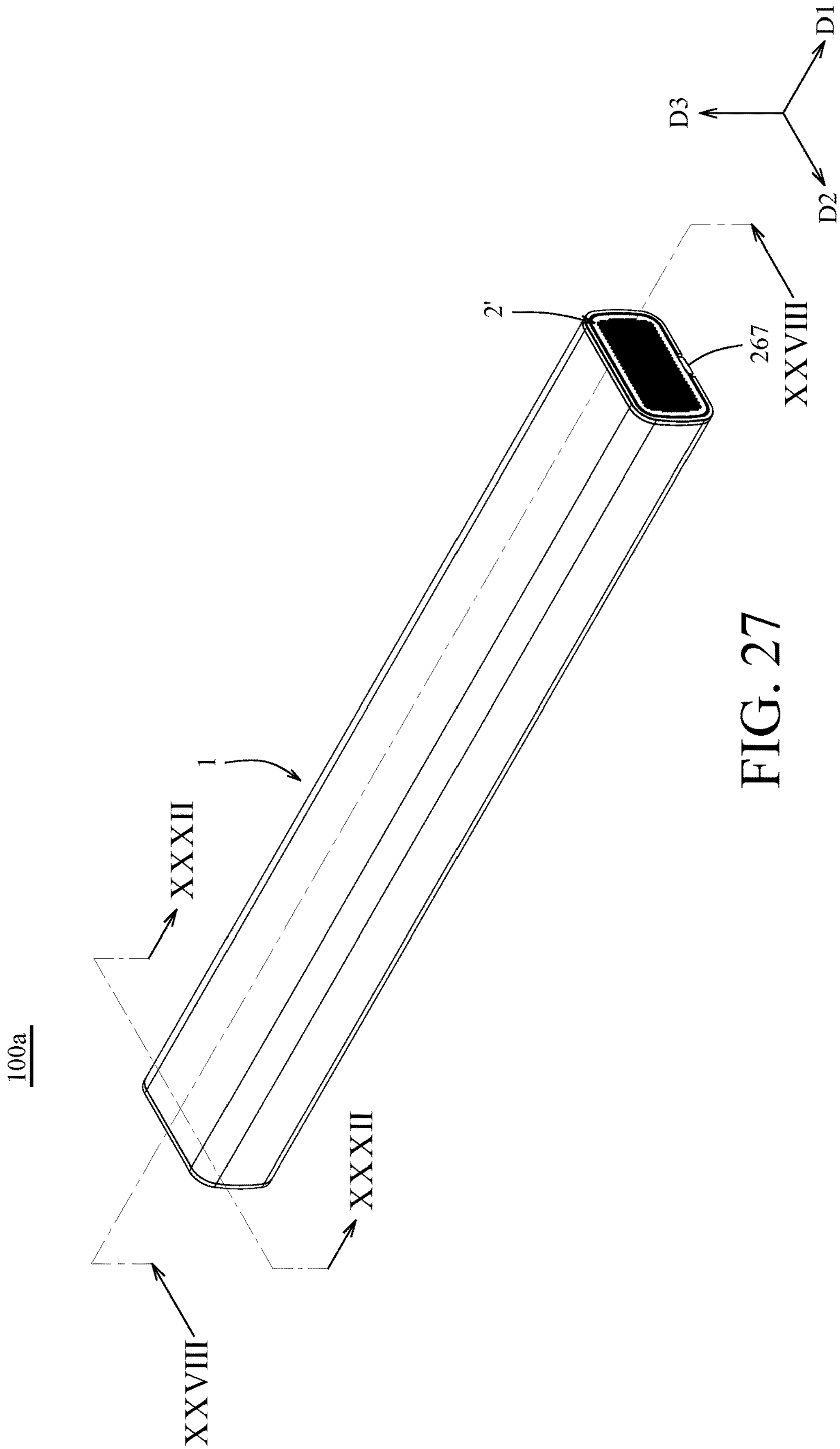
FIG. 27 is a perspective view of a telescopic soundbar according to the fourth embodiment of the present disclosure.

Referring to FIGS. 25 and 26, when each of the first and second speaker devices 2, 2' is in the fully extended position, the sliding shell 21 of each of the first and second speaker devices 2, 2' is moved away from the respective lateral housing portion 161, and the engaging hook 165 of each lateral housing portion 161 rebounds through the stored restoring force thereof and automatically engages the engaging slot 218 of the sliding shell 21 of the respective one of the first and second speaker devices 2, 2' so as to prevent the first or second speaker device 2, 2' from sliding out of the fully extended position. At this time, the woofer 181 is exposed to the outside. Hence, the speaker module 22 of each of the first and second speaker devices 2, 2' can still be used in conjunction with the bass reflex speaker or guiding device 1.

Referring to FIGS. 27 to 30, the fourth embodiment of the telescopic soundbar (100*a*) of this disclosure is shown to have an overall structure substantially the same as the first embodiment. The difference between the fourth and first embodiments resides in the connection between each of the first and second speaker devices 2, 2' and the guiding device 1.

In the fourth embodiment, the elongated housing 11 of the guiding device 1 has a peripheral wall 168. The peripheral wall 168 defines the receiving space 113 located in a middle portion thereof for receiving the electronic control module 12, and has two open ends 1681 opposite to each other along a length thereof, and two guide spaces 170 respectively communicating with two opposite sides of the receiving space 113 and respectively having the open ends 1681. A bottom wall portion 169 of the peripheral wall 168 is formed with a plurality of positioning holes 171 spaced apart from each other along a length thereof. The number of the positioning holes 171 exemplified in this embodiment is six, but not limited thereto. Each three of the positioning holes 171 communicate with a corresponding one of the guide spaces 170. The bottom wall portion 169 is further formed with two notches 172 extending inwardly and respectively from the two open ends 1681 and respectively communicating with the guide spaces 170.

Figure 30:
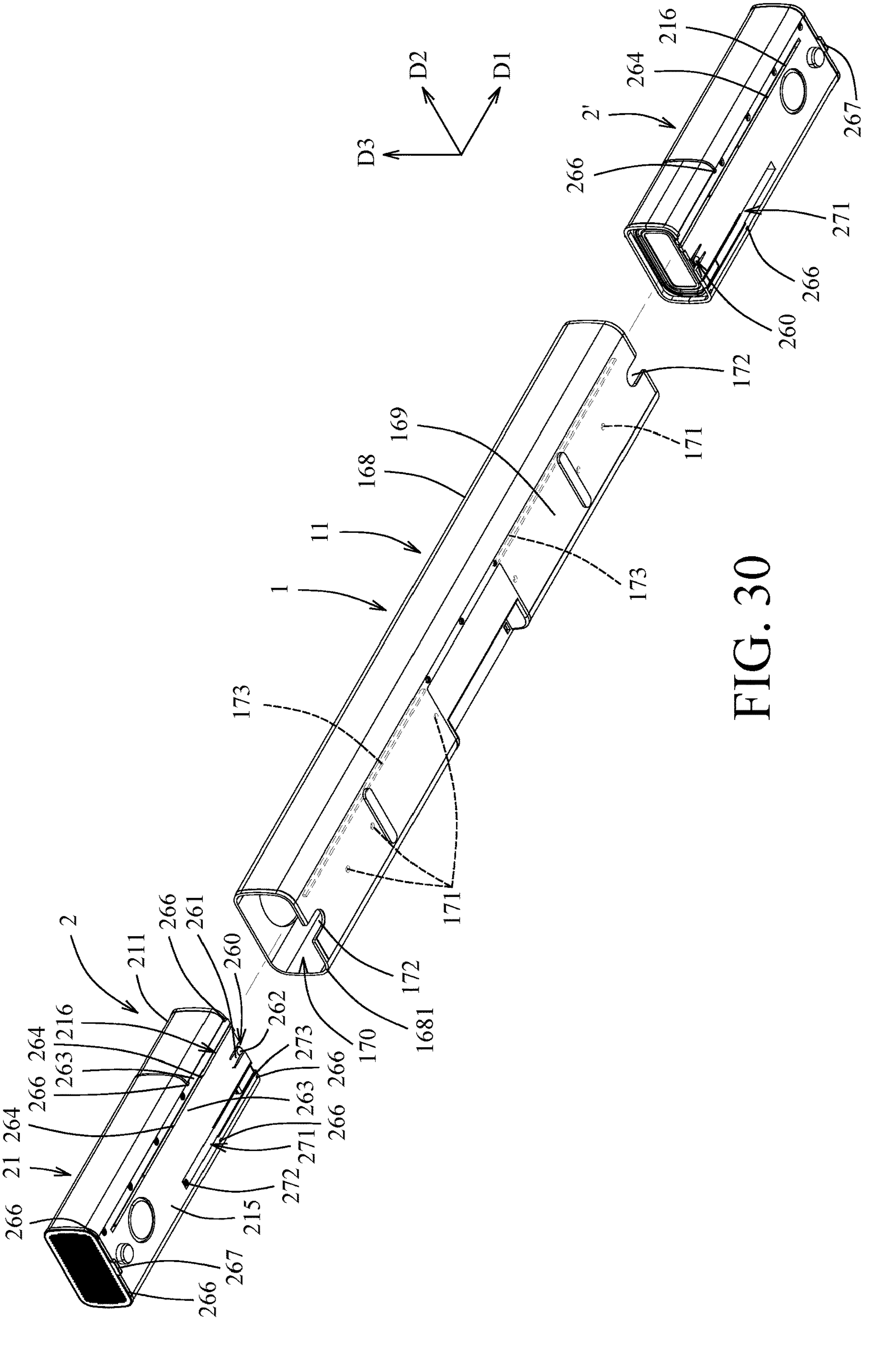
FIG. 30 is an exploded perspective view of the fourth embodiment taken from another angle.
Figure 31:
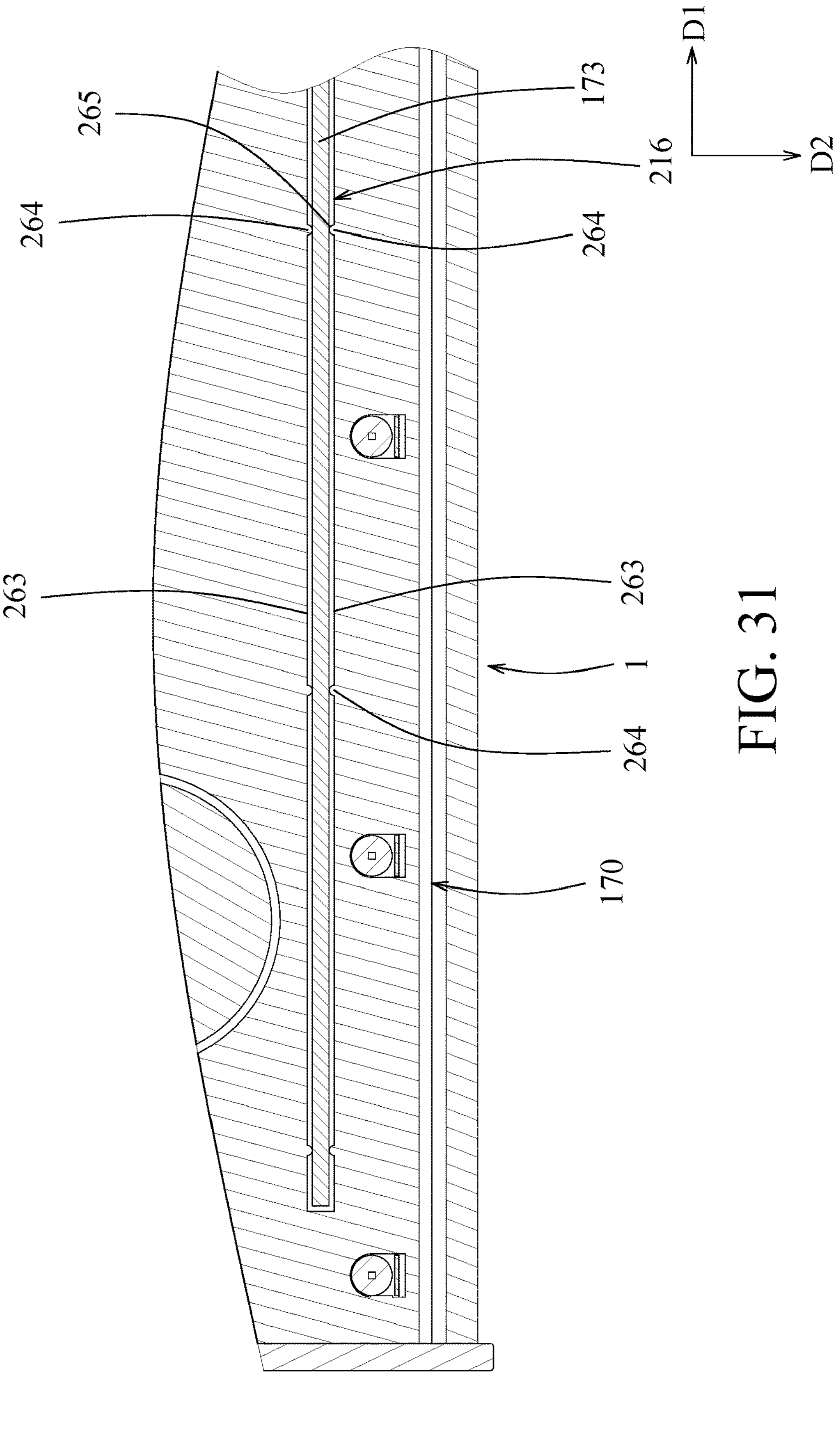
FIG. 31 is an enlarged fragmentary sectional view of a portion of the fourth embodiment, illustrating a slide groove of a sliding shell having two groove side walls respectively formed with a plurality of sliding protrusions in slidable contact with two opposite sides of a guide rail of the guiding device.
Figure 32:
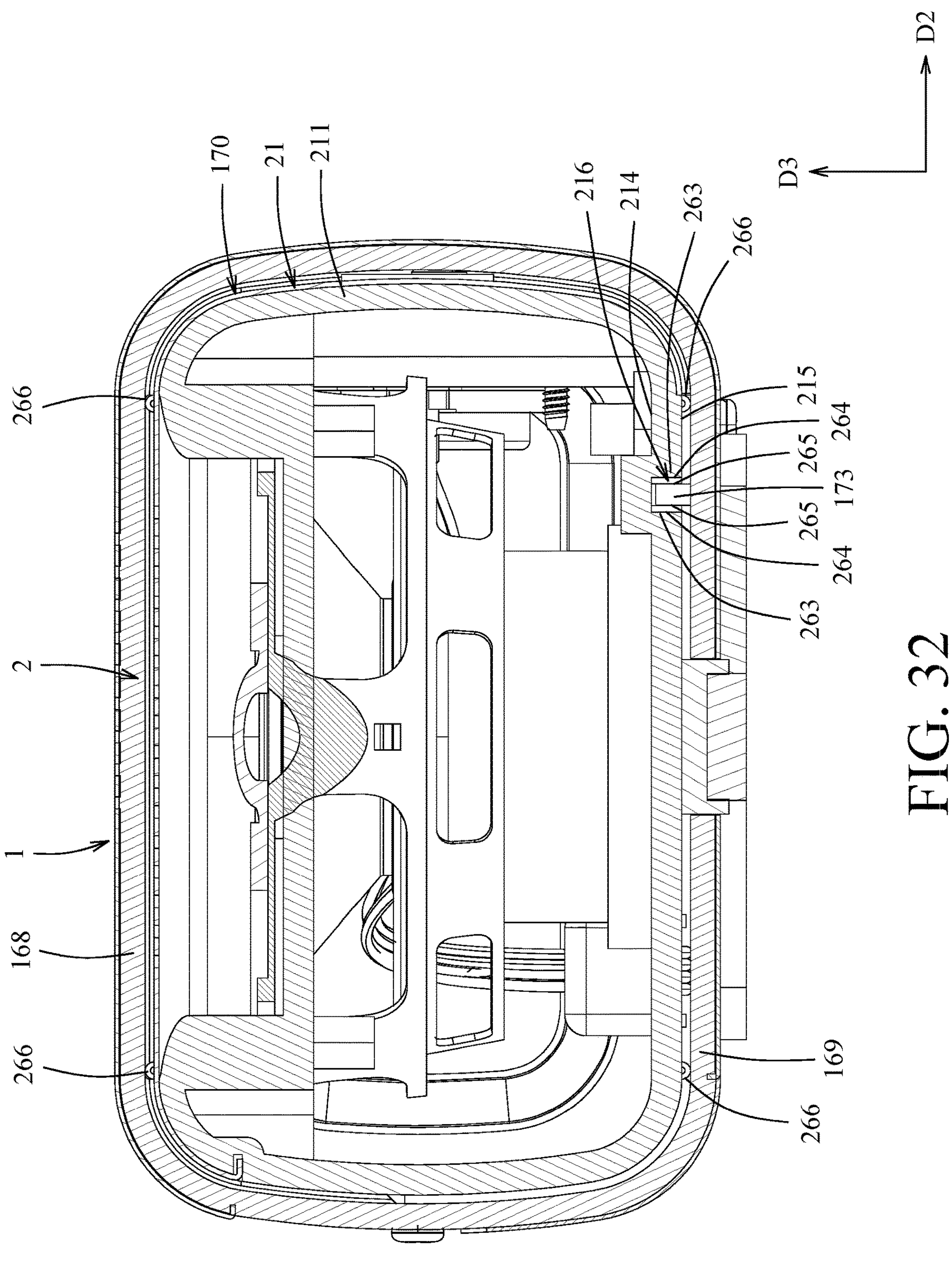
FIG. 32 is a sectional view taken along line XXXII-XXXII of FIG. 27.

Referring to FIGS. 31 and 32, in combination with FIG. 30, the guiding device 1 of this embodiment includes two guide rails 173. Each guide rail 173 extends along the length direction (D1), and projects integrally from an inner wall surface of the bottom wall portion 169 into a respective one of the guide spaces 170.

Referring back to FIGS. 28 to 30, the sliding shell 21 of each of the first and second speaker devices 2, 2' is slidably inserted into the respective guide space 170, and is partially extendable out of the respective guide space 170. The sliding shell 21 has a resilient locking member 260 provided on the bottom wall portion of the surrounding wall 211. The resilient locking member 260 has a resilient plate 261, and a locking protrusion 262 projecting from a bottom surface of the resilient plate 261. The locking protrusion 262 is configured to engage with a selected one of the positioning holes 171 so as to lock the first or second speaker device 2, 2' in the retracted position, the half extended position, or the fully extended position. When each of the first and second speaker devices 2, 2' is in the retracted position, the sliding shell 21 is received in the respective guide space 170. When each of the first and second speaker devices 2, 2' is in the half extended position, the sliding shell 21 partially extends out of the respective guide space 170. When each of the first and second speaker devices 2, 2' is in the fully extended position, a major portion of the sliding shell 21 is moved away from the respective guide space 170 and is exposed to the outside.

Referring again to FIGS. 30 to 32, in this embodiment, the slide groove 216 formed in the bottom wall portion of the surrounding wall 211 of the sliding shell 21 of each of the first and second speaker devices 2, 2' is recessed from the outer wall surface 215 toward the inner wall surface 214. and is located at one side of the resilient locking member 260. The slide groove 216 extends along the length direction (D1), and slidably receives a respective one of the guide rails 173. The slide groove 216 has two spaced-apart groove side walls 263 respectively formed with a plurality of sliding protrusions 264 spaced apart from each other in the length direction (D1). The sliding protrusions 264 of the groove side walls 263 face each other, and are in slidable contact with two opposite sides of the respective guide rail 173. Through this configuration, a contact area between the sliding shell 21 and the respective guide rail 173 can be reduced so as to reduce the friction therebetween, so that the sliding shell 21 can smoothly slide relative to the respective guide rail 173. Specifically, each sliding protrusion 264 is elongated in the height direction (D3), and has a curved surface 265 that is semicircular. The curved surface 265 contacts the guide rail 173 through a line contact method for reducing the contact area between the sliding protrusion 264 and the guide rail 173 and increasing the smooth sliding movement of the sliding shell 21. Furthermore, the contact range between the sliding protrusion 264 and the guide rail 173 in the height direction (D3) can be increased, so that the sliding shell 21 will not shake relative to the guide rail 173 during the sliding movement thereof.

Figure 29:
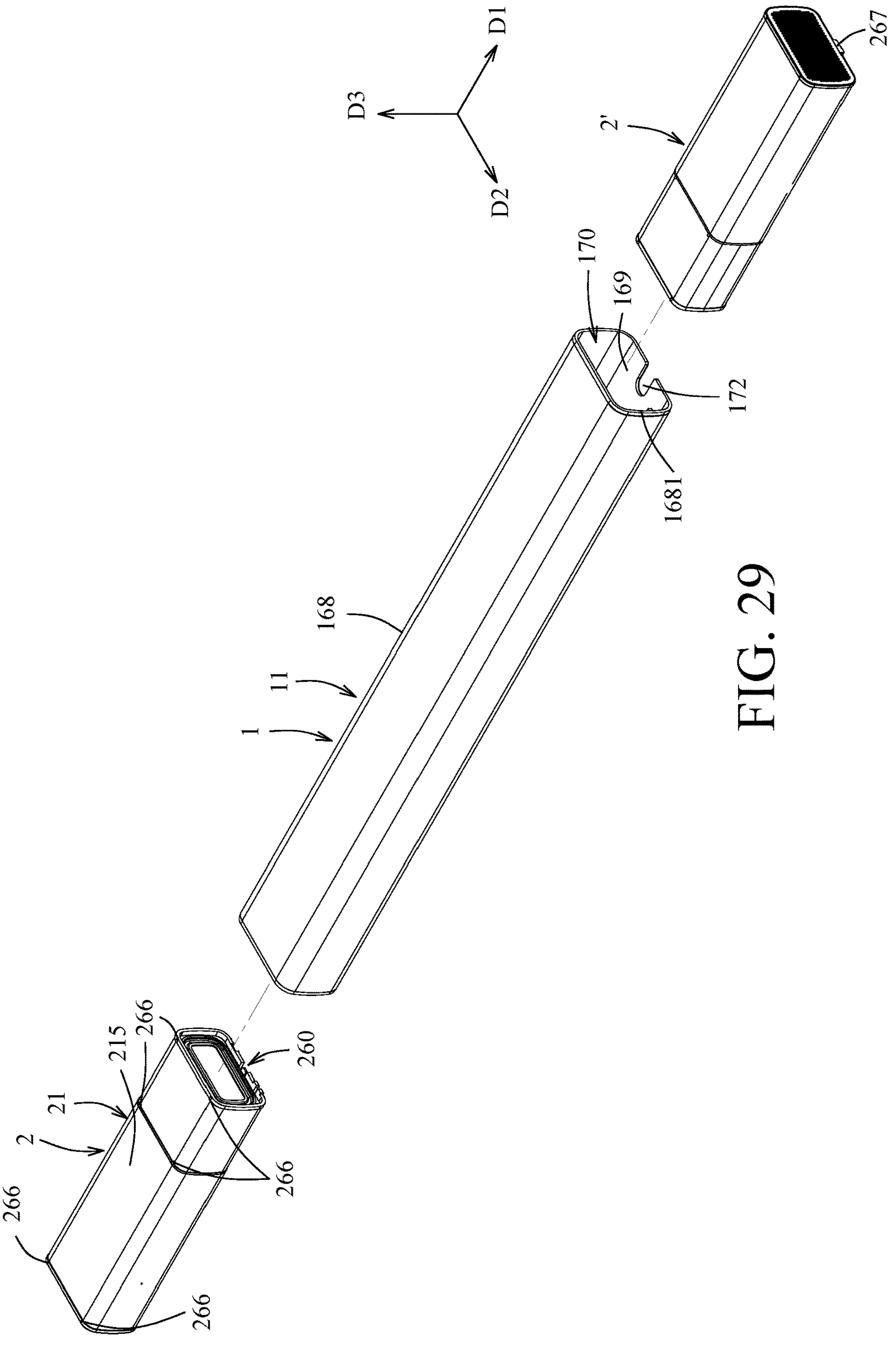
FIG. 29 is an exploded perspective view of the fourth embodiment.

With reference to FIGS. 29, 30 and 32, the sliding shell 21 of each of the first and second speaker devices 2, 2' further has a plurality of sliding protrusions 266 that are spaced apart from each other, that project integrally and outwardly from top and bottom sides of the outer wall surface 215 of the surrounding wall 211, and that are in slidable contact with an inner wall surface of the peripheral wall 168 of the elongated housing 11. Through this configuration, a contact area between the sliding shell 21 and the peripheral wall 168 can be reduced to reduce the friction therebetween, so that the sliding shell 21 can slide smoothly relative to the peripheral wall 168.

Figure 28:
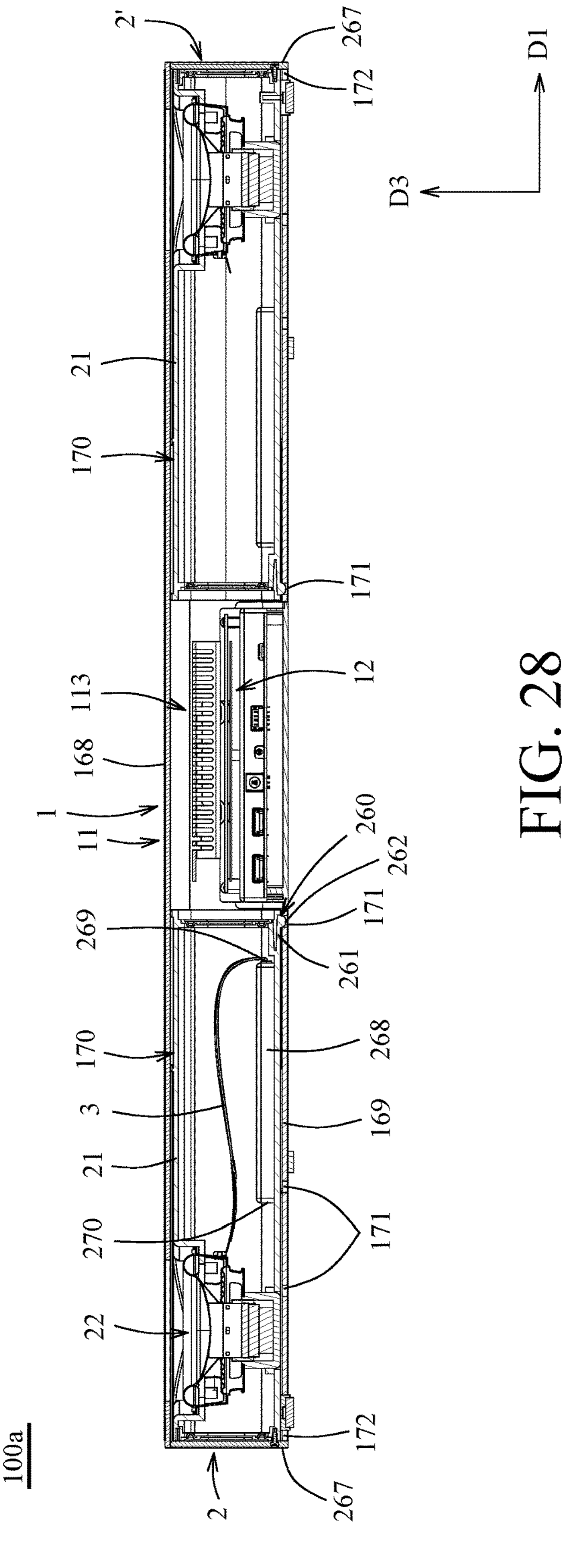
FIG. 28 is a sectional view taken along line XXVIII-XXVIII of FIG. 27.

With reference to FIGS. 28 and 30, the sliding shell 21 of each of the first and second speaker devices 2, 2' further has a pulling protrusion 267 opposite to the resilient locking member 260 in the length direction (D1). The pulling protrusion 267 protrudes outwardly from the bottom side of the outer wall surface 215 of the surrounding wall 211, and is received in a respective one of the notches 172 for a finger of the user to pull. When the user desires to pull the first or second speaker device 2, 2' outwardly from the retracted position, the user can first extend his/her finger into the respective notch 172 and then pull the pulling protrusion 267 outwardly. Through this pulling force, the locking protrusion 262 of the resilient locking member 260 is also pulled away from the selected positioning hole 171 to release the locking state thereof, so that the user can conveniently pull out the first or second speaker device 2, 2'. Hence, convenience of operation of this disclosure for the user can be improved.

Figure 33:
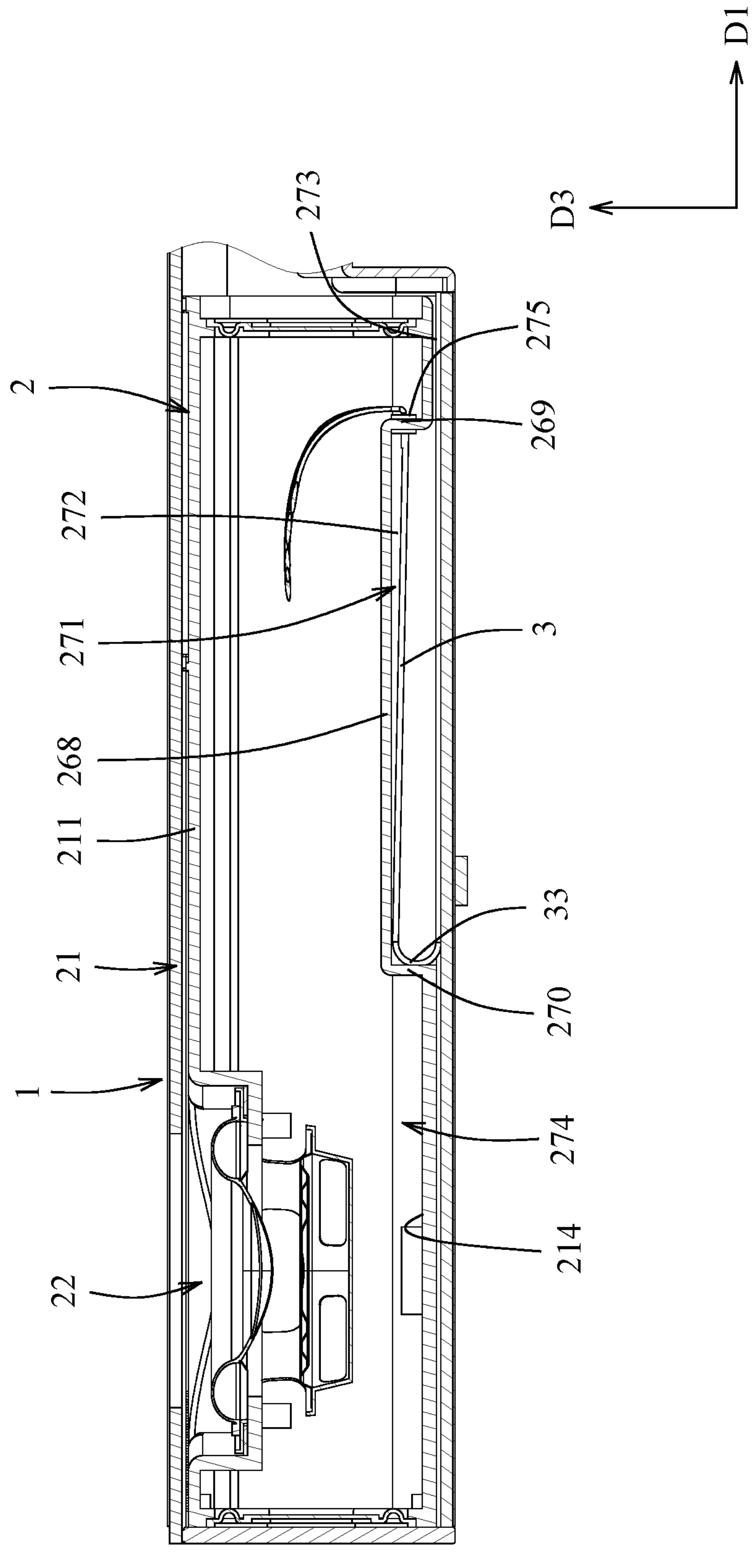
FIG. 33 is a fragmentary sectional view of FIG. 28, illustrating the sliding shell further having a protruding cover projecting inwardly from a bottom wall portion of a surrounding wall 211 thereof.

Referring to FIG. 33, in combination with FIGS. 28 and 30, the sliding shell 21 of each of the first and second speaker devices 2, 2' further has a protruding cover 268 projecting integrally and inwardly from the bottom wall portion of the surrounding wall 211 and located at the other side of the resilient locking member 260. That is, the slide groove 216 and the protruding cover 268 are respectively located on two opposite sides of the resilient locking member 260. The protruding cover 268 has a first end wall 269 adjacent to the resilient locking member 260, and a second end wall 270 spaced apart from the first end wall 269 in the length direction (D1). The surrounding wall 211 and the protruding cover 268 cooperatively define a wire collecting groove 271 that opens downwardly. The wire collecting groove 271 has a wire collecting groove section 272, and a wire guiding groove section 273 communicating with an end of the wire collecting groove section 272 and adjacent to the resilient locking member 260. The wire collecting groove section 272 has a length along the length direction (D1) greater than a length of the wire guiding groove section 273 along the length direction (D1). The wire collecting groove section 272 has a height along the height direction (D3) greater than a height of the wire guiding groove section 273 along the height direction (D3). Through this, a volume of the wire collecting groove section 272 is greater than that of the wire guiding groove section 273.

The sliding shell 21 is formed with a chamber 274 for receiving the speaker module 22. Each of the first and second speaker devices 2, 2' further includes a wire retaining sleeve 275 disposed on the first end wall 269 and adjacent to a junction of the wire collecting groove section 272 and the wire guiding groove section 273. The transmission line 3 is connected between the speaker module 22 and the electronic control module 12. A portion of the transmission line 3 is received in the wire collecting groove 271 after extending through and held by the wire retaining sleeve 275, and has a folded portion 33. When each of the first and second speaker devices 2, 2' is in the retracted position, the folded portion 33 of the transmission line 3 is distal to the wire retaining sleeve 275, and is adjacent to the second end wall 270.

Figure 34:
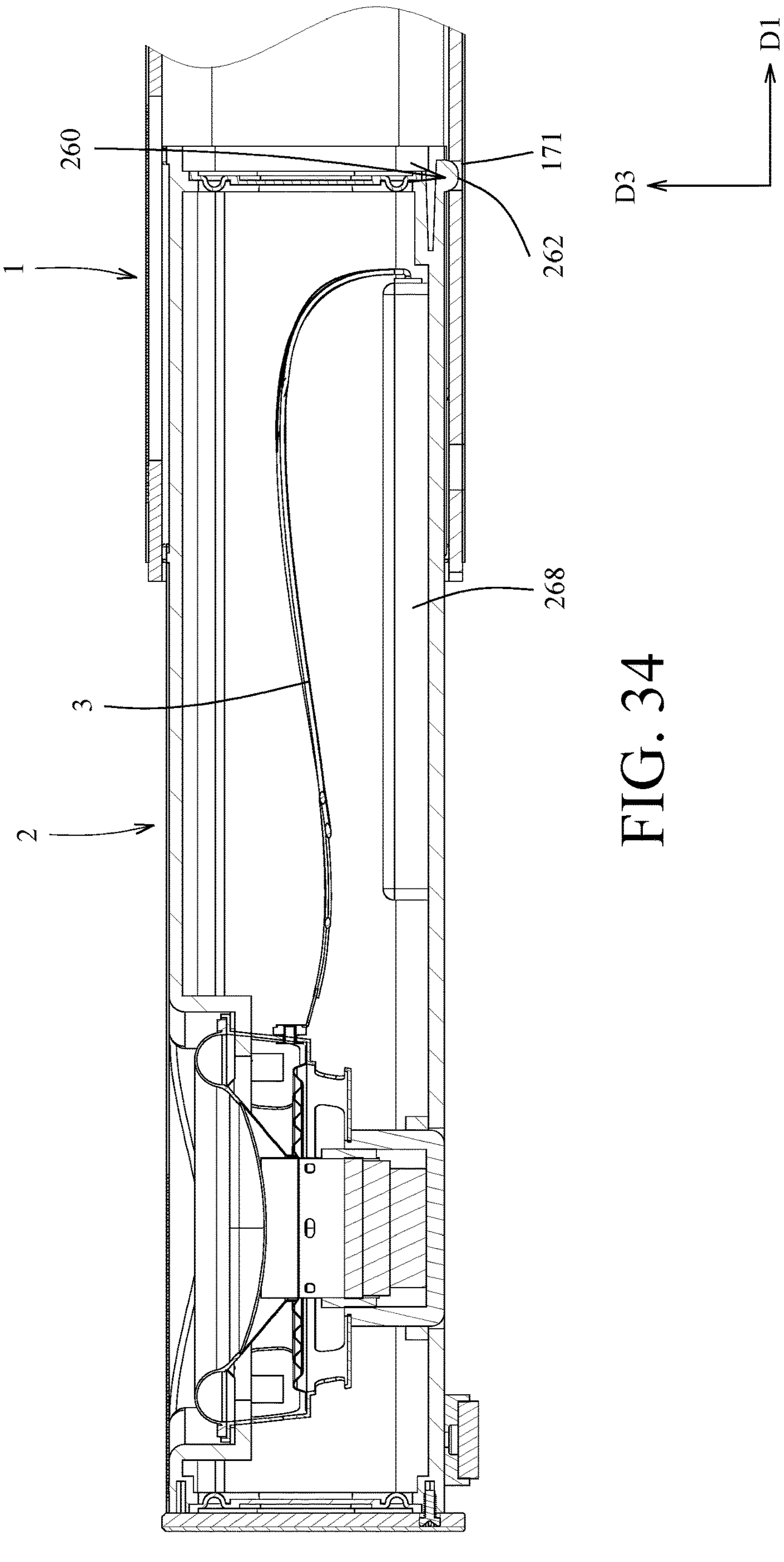
FIG. 34 is an enlarged fragmentary sectional view of FIG. 28, but with the first speaker device in the fully extended position.
Figure 35:
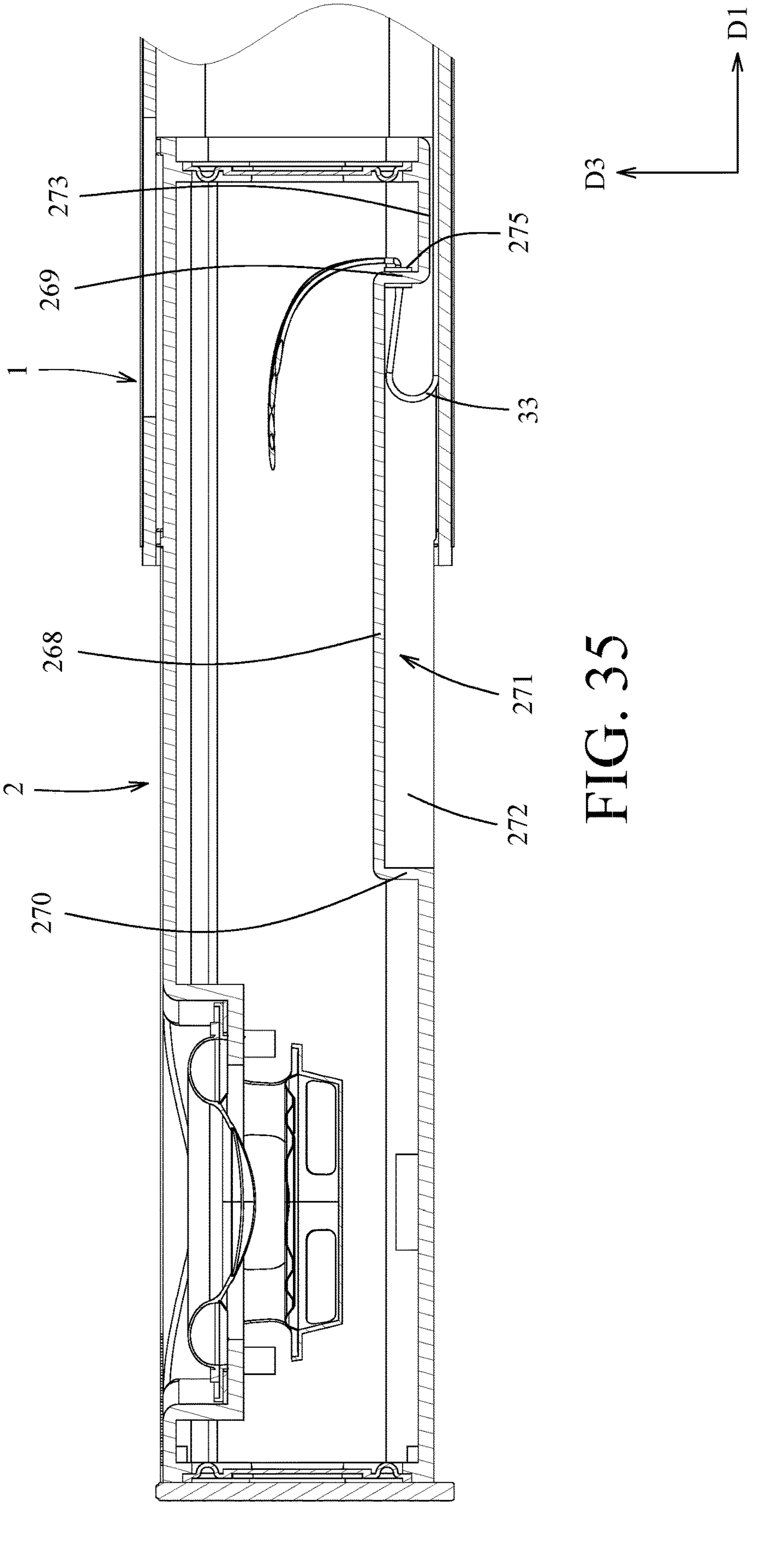
FIG. 35 is another enlarged fragmentary sectional view of FIG. 28, illustrating a folded portion of a transmission line adjacent to a wire retaining sleeve when the first speaker device is in the fully extended position.
Figure 36:
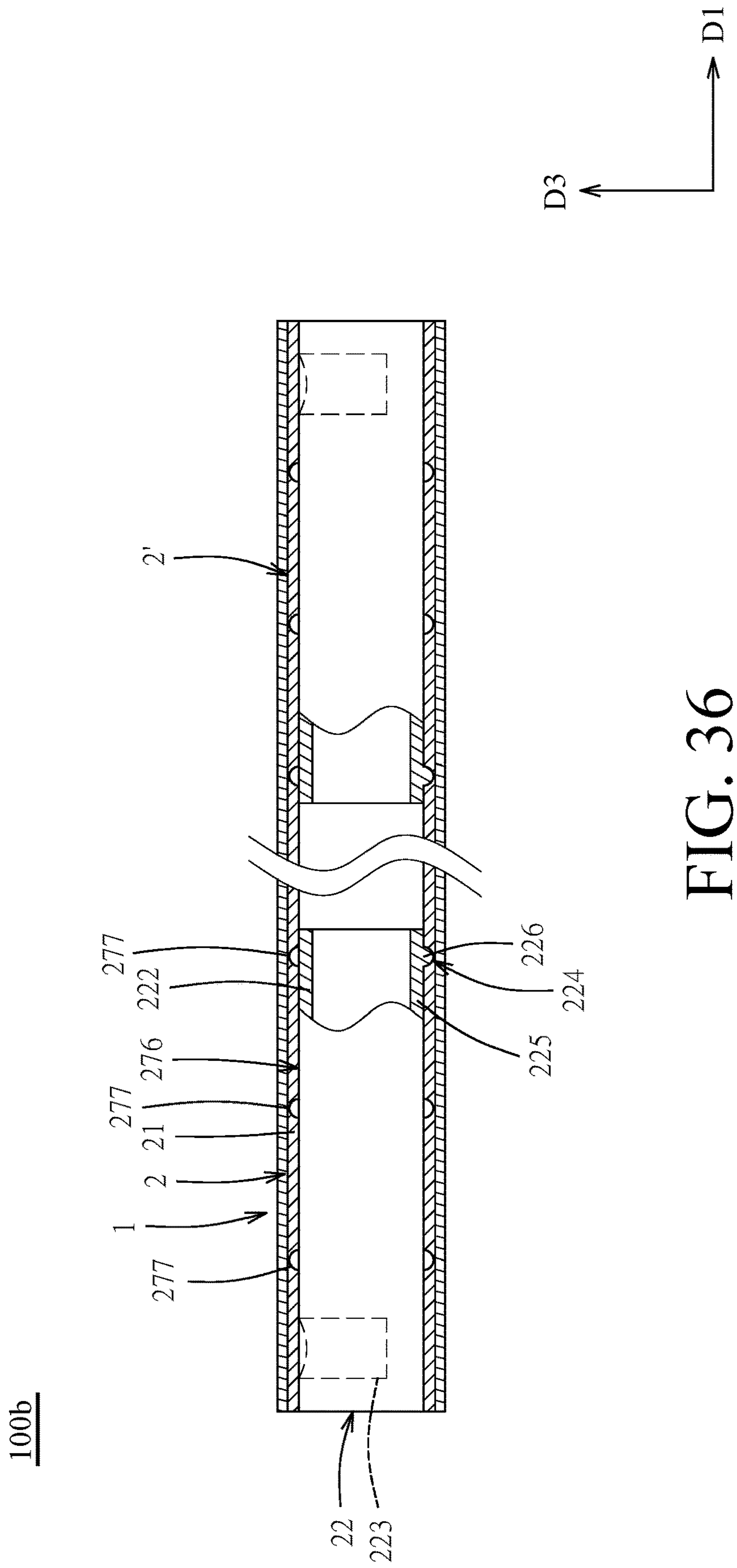
FIG. 36 is a fragmentary sectional view of a telescopic soundbar according to the fifth embodiment of the present disclosure.
Figure 37:
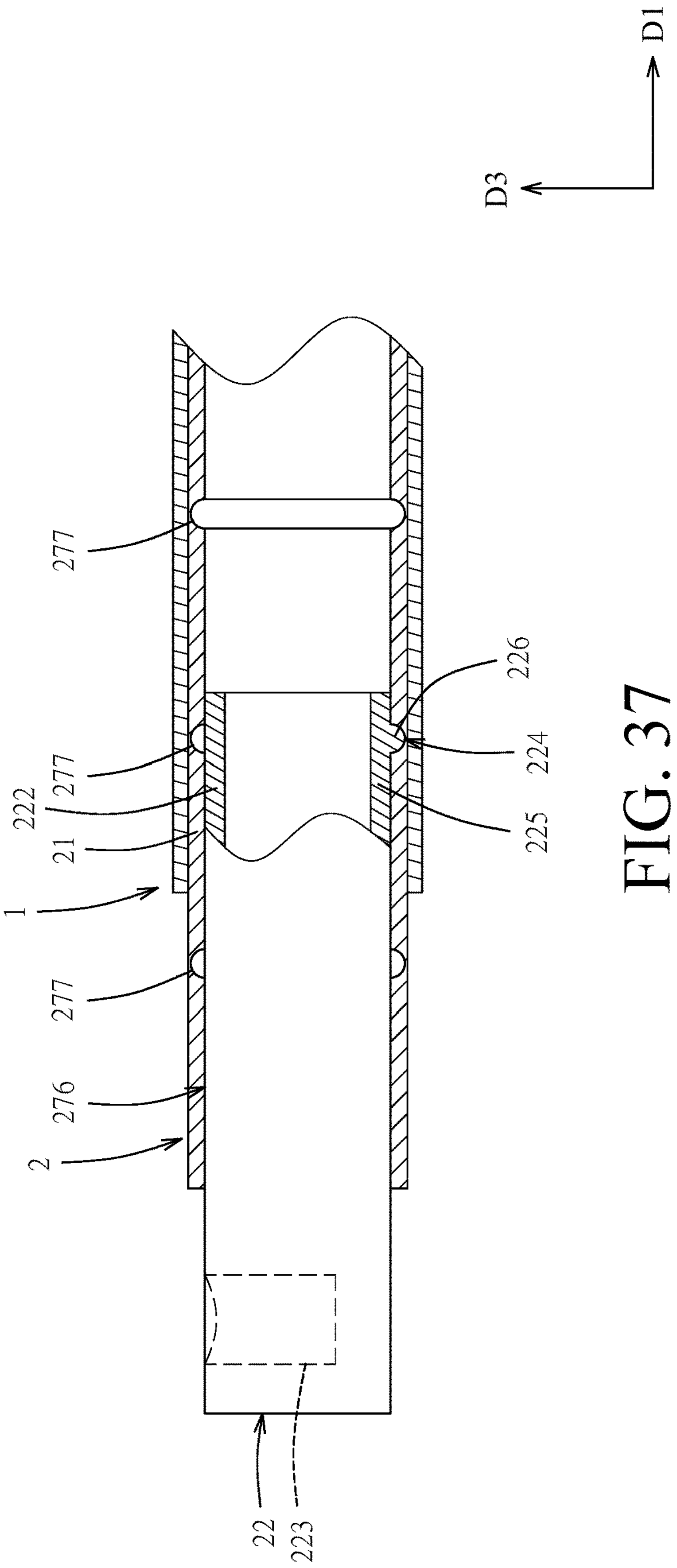
FIG. 37 is another fragmentary sectional view of the fifth embodiment, illustrating how a locking protrusion of a resilient locking member of a speaker module can engage with one of positioning slots formed in the sliding shell.

Referring to FIGS. 34 and 35, in combination with FIG. 33, when the first or second speaker device 2, 2' (see FIG. 30) is slid outwardly from the retracted position, the transmission line 3 is moved out of the wire collecting groove section 272 through the wire guiding groove section 273 such that the folded portion 33 thereof continuously changes and gradually approaches the wire retaining sleeve 275 and the first end wall 269. When the first or second speaker device 2, 2' device 2' is slid outwardly to the fully extended position, as shown in FIG. 35, the folded portion 33 of the transmission line 3 is adjacent to the wire retaining sleeve 275 and the first end wall 269, and is distal to the second end wall 270.

On the contrary, when the first or second speaker device 2, 2' is slid inwardly from the fully extended position, the transmission line 3 moves into the wire collecting groove section 272 through the wire guiding groove section 273 such that the folded portion 33 of the transmission line 3 continuously changes and gradually approaches the second end wall 270. When the first or second speaker device 2, 2' is slid inwardly to the retracted position, as shown in FIG. 33, the folded portion 33 is distal to the wire retaining sleeve 275 and is adjacent to the second end wall 270.

Through the design of the wire collecting groove 271, the sliding shell 21 can serve the function of guiding and collecting the transmission line 3 to prevent the transmission line 3 from being arbitrarily pulled during the sliding movement the first or second speaker device 2, 2' and to prevent the transmission line 3 from obstructing the sliding movement of the first or second speaker device 2, 2'.

Referring to FIGS. 36 to 39, the fifth embodiment of the telescopic soundbar (100*b*) of this disclosure is shown to have an overall structure substantially the same as the fourth embodiment. The difference between the fifth and fourth embodiments resides in the structure of the first and second speaker devices 2, 2'.

In the fifth embodiment, the sliding shell 21 of each of the first and second speaker devices 2, 2' is formed with a guiding groove 276, and a plurality of positioning slots 277 communicating with the guiding groove 276 and spaced apart from each other along a length of the sliding shell 21. The guiding groove 276 is cylindrical, and each positioning slot 277 is annular. The speaker module 22 is slidably received in the guiding groove 276, and has a portion extendable out of the guiding groove 276. The speaker module 22 is slidable relative to the sliding shell 21 between different positions, and includes a casing 222, and a speaker 223 disposed in the casing 222. The casing 222 is cylindrical, is connected rotatably and slidably to the guiding groove 276, and has a resilient locking member 224. The resilient locking member 224 has a resilient plate 225, and a locking protrusion 226 projecting outwardly from an outer surface of the resilient plate 225. The locking protrusion 226 is configured to engage with a selected one of the positioning slots 277 so as to lock the first or second speaker device 2, 2' in a selected one of the different positions. Through this, the length of the telescopic soundbar (100*b*) can be adjusted to be longer to match a larger size television.

Figure 38:
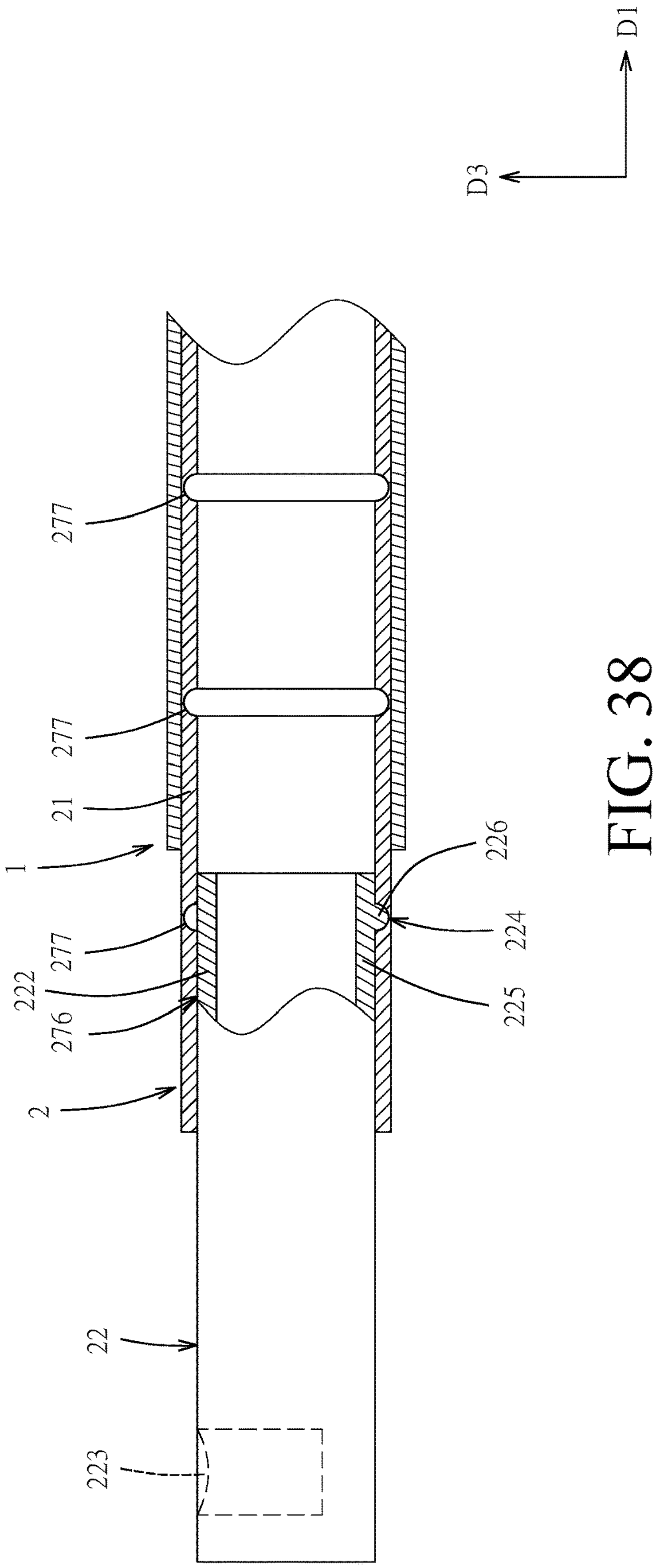
FIG. 38 is a view similar to FIG. 37, but with the speaker module being slid away from the sliding shell.
Figure 39:
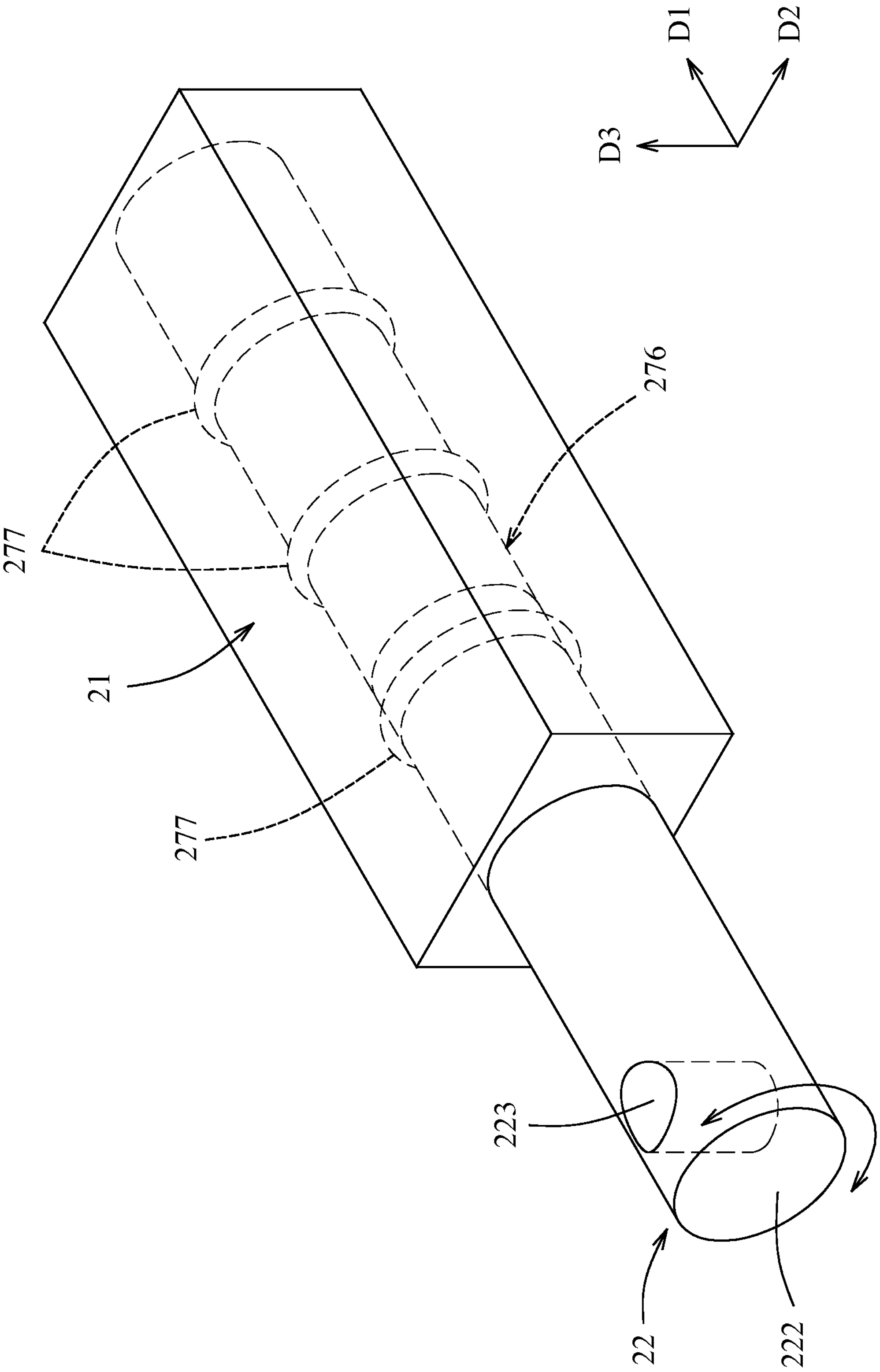
FIG. 39 is a perspective view of an assembly of the sliding shell and the speaker module of the fifth embodiment.

With reference to FIGS. 38 and 39, when the locking protrusion 226 of the resilient locking member 224 is engaged with the selected one of the positioning slots 277, it can rotate relative to the selected positioning slot 277. Through this, the sound angle of the speaker 223 of the speaker module 22 can be arbitrarily adjusted according to the requirement, thereby enhancing the flexibility of use of this disclosure.

Figure 40:
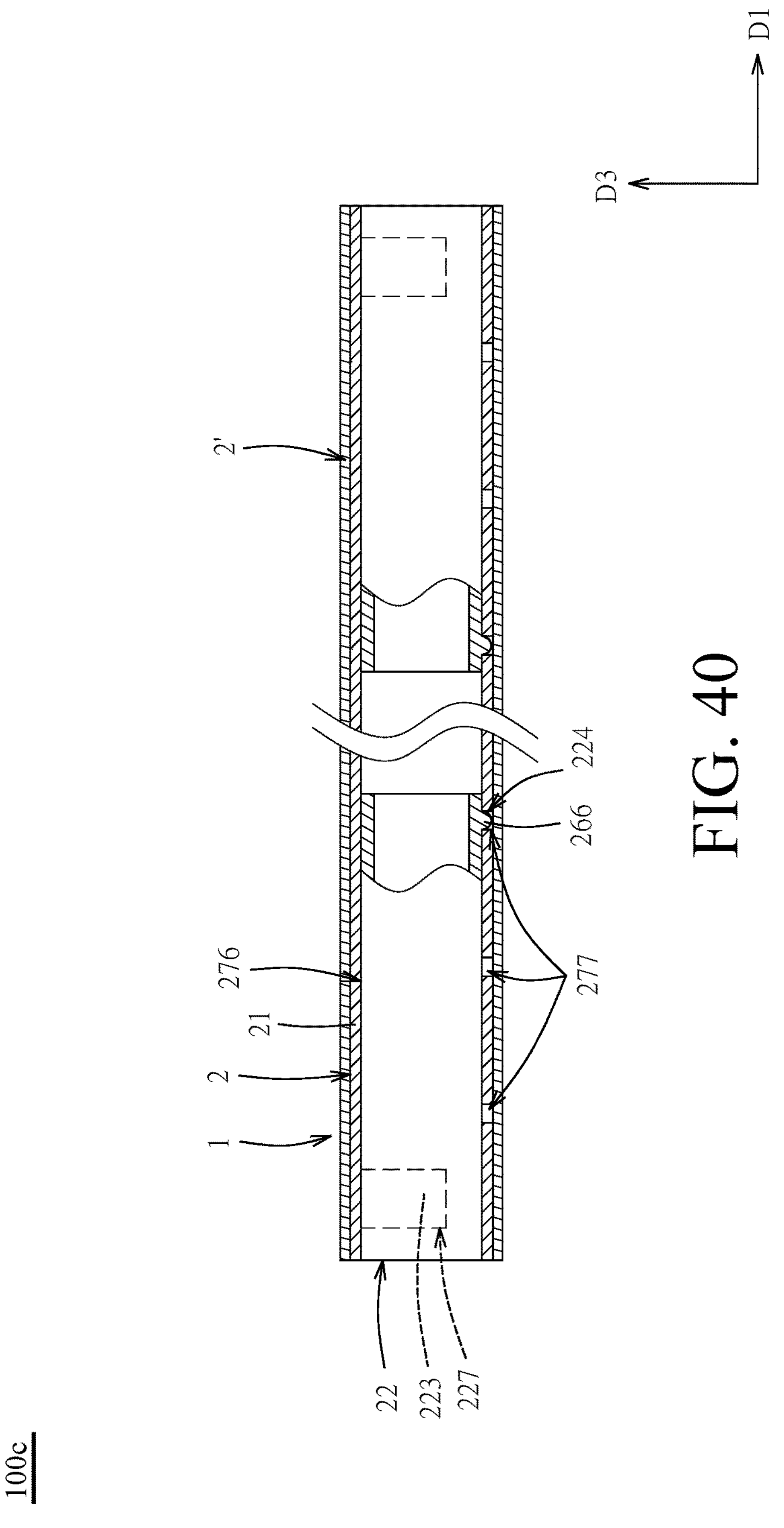
FIG. 40 is a fragmentary sectional view of a telescopic soundbar according to the sixth embodiment of the present disclosure.
Figure 41:
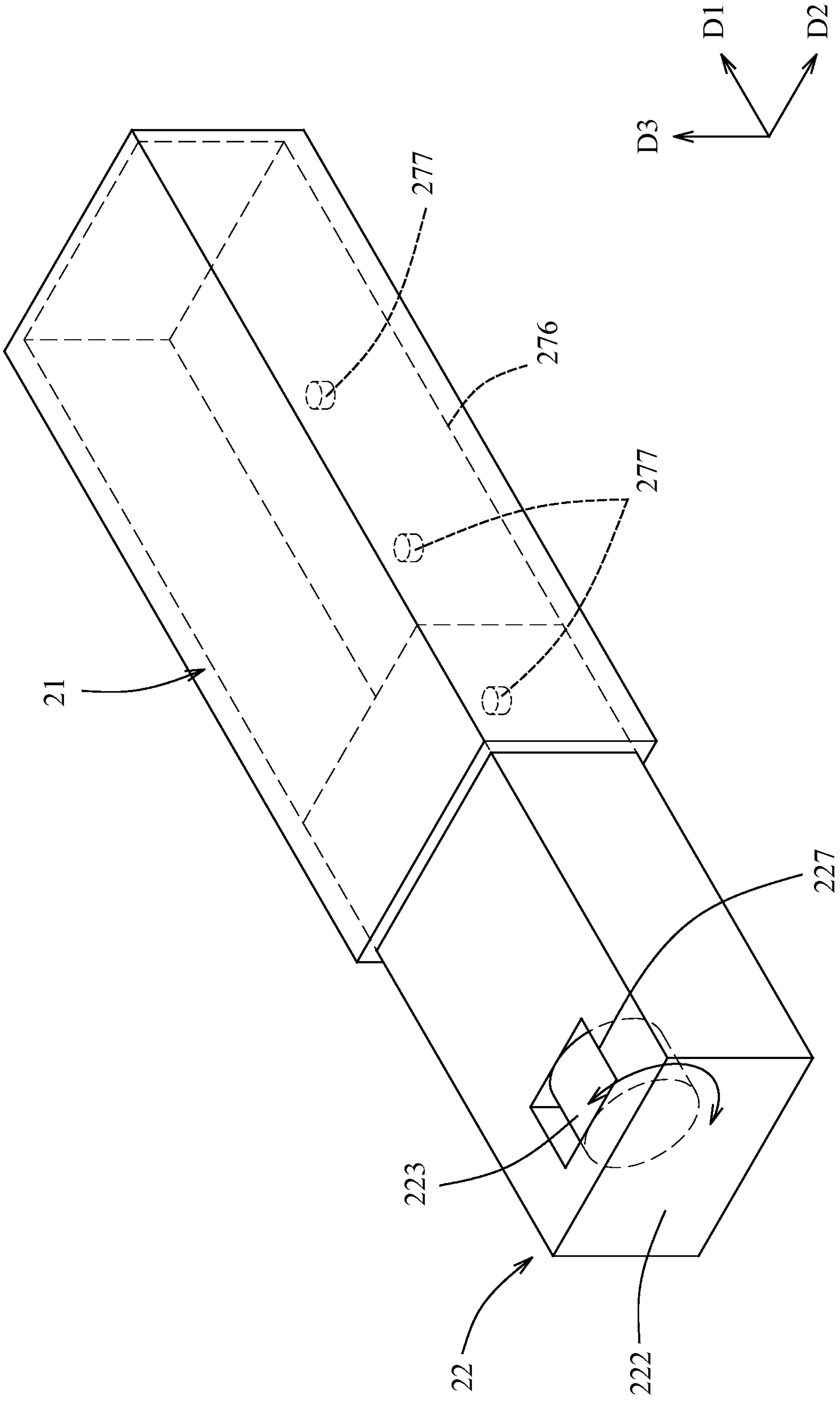
FIG. 41 is a perspective view of an assembly of a sliding shell and a speaker module of the sixth embodiment.

Referring to FIGS. 40 and 41, the sixth embodiment of the telescopic soundbar (100*c*) of this disclosure is shown to have an overall structure substantially the same as the fifth embodiment. The difference between the sixth and fifth embodiments resides in the structure of the first and second speaker devices 2, 2'.

In the sixth embodiment, the guiding groove 276 of the sliding shell 21 of each of the first and second speaker devices 2, 2' is rectangular. Furthermore, the casing 222 of the speaker module 22 is also rectangular, is slidably connected to the guiding groove 276, and is formed with a pivot groove 227. The speaker 223 is rotatably connected in the pivot groove 227, and is partially exposed from the casing 222 through the pivot groove 227 for rotation by the user. Through this, the sound angle of the speaker 223 of the speaker module 22 can be arbitrarily adjusted according to the requirement, thereby enhancing the flexibility of use of this disclosure.

In summary, by virtue of at least one of the first and second speaker devices 2, 2' being a sliding speaker device slidably connected to the guiding device 1, the user can adjust and change the length of the telescopic soundbar 100, 100', 100", 100*a*, 100*b*, 100*c* according to his/her requirements, such as matching the length of the television or improving the sound performance thereof, thereby increasing the flexibility of use of this disclosure. In addition. the length of the telescopic soundbar 100, 100', 100", 100*a*, 100*b*, 100*c* can be adjusted to be longer so that the telescopic soundbar 100, 100', 100", 100*a*, 100*b*, 100*c* can create a wider sound field, thereby providing the user with better sound experience. Furthermore. the length of the telescopic soundbar 100, 100', 100", 100*a*, 100*b*, 100*c* can be adjusted to be shorter, so that the packaging box can be loaded with more number of the telescopic soundbars 100, 100', 100", 100*a*, 100*b*, 100*c* to increase and optimize the loading capacity thereof. Therefore, the object of the present disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A telescopic soundbar having a length direction, a width direction, and a height direction that are perpendicular to each other, said telescopic soundbar comprising:

- a guiding device; and
- a first speaker device and a second speaker device disposed on said guiding device and arranged along said length direction;
- wherein at least one of said first speaker device and said second speaker device is a sliding speaker device slidably connected to said guiding device and operable to telescopically slide relative to said guiding device in said length direction.

2. The telescopic soundbar as claimed in claim 1, wherein said guiding device includes an elongated housing extending in said length direction, and said at least one of said first speaker device and said second speaker device includes a sliding shell slidably connected to said elongated housing.

3. The telescopic soundbar as claimed in claim 2, wherein said sliding shell is slidably sleeved on said elongated housing, and is formed with a sliding space for receiving said elongated housing.

4. The telescopic soundbar as claimed in claim 3, wherein said at least one of said first speaker device and said second speaker device further includes a speaker module disposed in said sliding space, said at least one of said first speaker device and said second speaker device being at least slidable relative to said guiding device between a retracted position, in which said speaker module is adjacent to said elongated housing, and said sliding space receives a portion of said elongated housing; and a fully extended position, in which said speaker module is moved away from said elongated housing, and said portion of said elongated housing is exposed to the outside.

5. The telescopic soundbar as claimed in claim 4, wherein:

said elongated housing defines a receiving space;

said at least one of said first speaker device and said second speaker device further includes a push rod disposed on one side of said speaker module for insertion into said receiving space;

said telescopic soundbar further comprises a transmission line connected between said elongated housing and said speaker module, said transmission line having a held section held by said push rod, and a non-held section which is not held by said push rod and which is located in said receiving space;

when said at least one of said first speaker device and said second speaker device is in said retracted position, said push rod and said held section are located in said receiving space, and said push rod pushes said non-held section so as to place said non-held section in a tightened state; and when said at least one of said first speaker device and said second speaker device is in said fully extended position, said push rod and said held section are moved out of said receiving space, and said push rod does not push said non-held section so as to place said non-held section in a relaxed state.

6. The telescopic soundbar as claimed in claim 4, wherein said elongated housing has at least one stop ring surface, and an engaging hook spaced apart from said at least one stop ring surface along said length direction, said sliding shell being further formed with an engaging slot for engaging said engaging hook, said at least one stop ring surface being configured to stop said sliding shell so as to position said at least one of said first speaker device and said second speaker device in said retracted position, said engaging hook being configured to engage said engaging slot so as to prevent said at least one of said first speaker device and said second speaker device from sliding out of said fully extended position.

7. The telescopic soundbar as claimed in claim 4, wherein:

said guiding device further includes a woofer disposed in said elongated housing;

said sliding shell has a surrounding wall formed with a sound hole;

when said at least one of said first speaker device and said second speaker device is in said retracted position, said sliding shell corresponds in position to said woofer through said sound hole; and when said at least one of said first speaker device and said second speaker device is in said fully extended position, said sliding shell is moved away from said woofer to expose said woofer to the outside.

8. The telescopic soundbar as claimed in claim 3, wherein said first speaker device and said second speaker device are oppositely disposed on said guiding device along said length direction, each of said first speaker device and said second speaker device being a sliding speaker device slidably connected to said guiding device, said elongated housing having two half housing portions arranged along said length direction, said sliding space of said sliding shell of each of said first speaker device and said second speaker device being configured to receive a respective one of said half housing portions, each of said first speaker device and said second speaker device further including a speaker module disposed in said sliding space, each of said first speaker device and said second speaker device being slidable relative to said guiding device between a retracted position, in which said speaker module is adjacent to said respective one of said half housing portions, and each of said half housing portions is received in said sliding space of said sliding shell of a respective one of said first speaker device and said second speaker device; and a fully extended position, in which said speaker module of each of said first speaker device and said second speaker device is moved away from said respective one of said half housing portions, and a major portion of each of said half housing portions is exposed to the outside.

9. The telescopic soundbar as claimed in claim 2, wherein said elongated housing is formed with at least one guide space, and said sliding shell is slidably inserted into said at least one guide space, and is partially extendable out of said at least one guide space.

10. The telescopic soundbar as claimed in claim 9, wherein said at least one of said first speaker device and said second speaker device is at least slidable relative to said guiding device between a retracted position, in which said sliding shell is received in said at least one guide space, and a fully extended position, in which a major portion of said sliding shell is moved away from said at least one guide space and is exposed to the outside.

11. The telescopic soundbar as claimed in claim 10, wherein:

said sliding shell is formed with a wire collecting groove, said wire collecting groove having a wire collecting groove section and a wire guiding groove section communicating with an end of said wire collecting groove section;

said at least one of said first speaker device and said second speaker device further includes a speaker module disposed in said sliding shell, and a wire retaining sleeve disposed in said sliding shell and adjacent to a junction of said wire collecting groove section and said wire guiding groove section;

said telescopic soundbar further comprises a transmission line that extends through said wire retaining sleeve, that is held by said wire retaining sleeve, and that is connected to said speaker module, a portion of said transmission line being received in said wire collecting groove and having a folded portion located in said wire collecting groove section;

said folded portion is distal to said wire retaining sleeve when said at least one of said first speaker device and said second speaker device is in said retracted position, and is adjacent to said wire retaining sleeve when said at least one of said first speaker device and said second speaker device is in said fully extended position.

12. The telescopic soundbar as claimed in claim 11, wherein said wire collecting groove section has a length in said length direction greater than a length of said wire guiding groove section in said length direction, and a height in said height direction greater than a height of said wire guiding groove section in said height direction.

13. The telescopic soundbar as claimed in claim 9, wherein said guiding device further includes a guide rail that is disposed in said elongated housing, that is located in said at least one guide space and that extends in said length direction, said sliding shell being formed with a slide groove extending in said length direction and slidably receiving said guide rail, said slide groove having two spaced-apart groove side walls respectively formed with a plurality of sliding protrusions spaced apart from each other in said length direction, said sliding protrusions of said groove side walls facing each other and being in slidable contact with two opposite sides of said guide rail.

14. The telescopic soundbar as claimed in claim 13, wherein each of said sliding protrusions is elongated in said height direction, and has a curved surface that is semicircular and that contacts said guide rail through a line contact method.

15. The telescopic soundbar as claimed in claim 9, wherein said sliding shell has a plurality of sliding protrusions spaced apart from each other and in slidable contact with said elongated housing.

16. The telescopic soundbar as claimed in claim 9, wherein said elongated housing is further formed with a notch communicating with said at least one guide space, and said sliding shell has a pulling protrusion received in said notch for manual pulling.

17. The telescopic soundbar as claimed in claim 9, wherein said sliding shell is formed with a guiding groove, and said at least one of said first speaker device and said second speaker device further includes a speaker module slidably received in said guiding groove and having a portion extendable out of said guiding groove.

18. The telescopic soundbar as claimed in claim 17, wherein said speaker module is slidable relative to said sliding shell between different positions, said sliding shell being further formed with a plurality of positioning slots communicating with said guiding groove and spaced apart from each other along a length of said sliding shell, said speaker module having a resilient locking member for engaging with a selected one of said positioning slots to lock said speaker module in a selected one of said different positions.

19. The telescopic soundbar as claimed in claim 18, wherein said guiding groove is cylindrical, each of said positioning slots being annular, said speaker module including a casing, and a speaker disposed in said casing, said casing being cylindrical and being connected rotatably and slidably to said guiding groove, said casing having said resilient locking member, said resilient locking member being rotatable relative to said selected one of said positioning slots when said resilient locking member is engaged to said selected one of said positioning slots.

20. The telescopic soundbar as claimed in claim 18, wherein said guiding groove is rectangular, said speaker module including a casing and a speaker, said casing being rectangular and being slidably connected to said guiding groove, said casing having said resilient locking member and being formed with a pivot groove, said speaker being rotatably connected in said pivot groove and being partially exposed from said casing through said pivot groove for rotation.

21. The telescopic soundbar as claimed in claim 9, wherein said first speaker device and said second speaker device are oppositely disposed on said guiding device in said length direction, each of said first speaker device and said second speaker device being a sliding speaker device slidably connected to said guiding device, said elongated housing being formed with two said guide spaces spaced apart from each other in said length direction, said sliding shell of each of said first speaker device and said second speaker device being slidably received in a respective one of said guide spaces and being partially extendable out of said respective one of said guide spaces, each of said first speaker device and said second speaker device being slidable relative to said guiding device between a retracted position, in which said sliding shell is received in said respective one of said guide spaces, and a fully extended position, in which a major portion of said sliding shell is exposed to the outside.

22. The telescopic soundbar as claimed in claim 1, wherein said guiding device includes a guide rail extending in said length direction, and said at least one of said first speaker device and said second speaker device is formed with a slide groove for slidably receiving said guide rail.

23. The telescopic soundbar as claimed in claim 22, wherein said guiding device further includes an elongated housing extending in said length direction, said guide rail being disposed on said elongated housing, said at least one of said first speaker device and said second speaker device including a sliding shell slidably connected to said elongated housing and formed with said slide groove.

24. The telescopic soundbar as claimed in claim 23, wherein said slide groove has two spaced-apart groove side walls respectively formed with a plurality of sliding protrusions spaced apart from each other in said length direction, said sliding protrusions of said groove side walls facing each other and being in slidable contact with two opposite sides of said guide rail.

25. The telescopic soundbar as claimed in claim 1, wherein said at least one of said first speaker device and said second speaker device is slidable relative to said guiding device between different positions, one of said guiding device and said at least one of said first speaker device and said second speaker device being formed with a plurality of positioning holes spaced apart from each other in said length direction, the other one of said guiding device and said at least one of said first speaker device and said second speaker device including a resilient locking member for engaging with a selected one of said positioning holes to lock said at least one of said first speaker device and said second speaker device in a selected one of said different positions.

26. The telescopic soundbar as claimed in claim 25, wherein said guiding device includes an elongated housing extending in said length direction and having said resilient locking member, and said at least one of said first speaker device and said second speaker device includes a sliding shell slidably sleeved on said elongated housing along said length direction and formed with said plurality of said positioning holes.

27. The telescopic soundbar as claimed in claim 26, wherein said guiding device further includes a guide rail disposed on said elongated housing and extending in said length direction, said resilient locking member being connected to said guide rail, said guide rail having a protruding section that protrudes out of one side of said elongated housing, that has a distal end distal to said one side of said elongated housing, and that is formed with a receiving slot adjacent to said distal end for receiving said resilient locking member, said sliding shell being further formed with a slide groove extending along a length of said sliding shell for slidably receiving said guide rail and communicating with said positioning holes, said resilient locking member having a resilient plate received in said receiving slot, and a locking protrusion that protrudes from said resilient plate and out of said receiving slot for engaging said selected one of said positioning holes.

28. The telescopic soundbar as claimed in claim 25, wherein said guiding device includes an elongated housing extending in said length direction and formed with said positioning holes and a guide space communicating with said positioning holes, and said at least one of said first speaker device and said second speaker device includes a sliding shell slidably inserted into said guide space and having said resilient locking member.

29. The telescopic soundbar as claimed in claim 1, wherein said guiding device includes a rack portion extending in said length direction, and said at least one of said first speaker device and said second speaker device includes a motor, and a gear that is connected to and driven by said motor to rotate and that meshes with said rack portion.

30. The telescopic soundbar as claimed in claim 29, wherein said at least one of said first speaker device and said second speaker device is slidable relative to said guiding device between a retracted position and a fully extended position, said guiding device being formed with a receiving slot extending along said length direction for receiving said gear said receiving slot having one side formed with said rack portion, said guiding device further including a first stop face and a second stop face respectively located on two opposite ends of said receiving slot, said first stop face being configured to stop said gear so as to limit said at least one of said first speaker device and said second speaker device in said retracted position, said second stop face being configured to stop said gear so as to limit said at least one of said first speaker device and said second speaker device in said fully extended position.

31. The telescopic soundbar as claimed in claim 30, wherein said guiding device further includes an elongated housing extending in said length direction, and a guide rail disposed on and protruding from one side of said elongated housing and extending in said length direction, said guide rail having said receiving slot, said rack portion, said first stop face, and said second stop face, said at least one of said first speaker device and said second speaker device including a sliding shell slidably sleeved on said elongated housing along said length direction and formed with a slide groove extending along a length of said sliding shell for slidably receiving said guide rail.

32. The telescopic soundbar as claimed in claim 1, wherein said first speaker device and said second speaker device are oppositely disposed on said guiding device along said length direction, and each of said first speaker device and said second speaker device is a sliding speaker device slidably connected to said guiding device.

* * * * *